United States Patent
Opferman et al.

(10) Patent No.: US 11,461,098 B2
(45) Date of Patent: Oct. 4, 2022

(54) APPARATUSES, METHODS, AND SYSTEMS FOR INSTRUCTIONS FOR OPERATING SYSTEM TRANSPARENT INSTRUCTION STATE MANAGEMENT OF NEW INSTRUCTIONS FOR APPLICATION THREADS

(71) Applicant: Intel Corporation, Santa Clara, CA (US)

(72) Inventors: Toby Opferman, Beaverton, OR (US); Prashant Sethi, Folsom, CA (US); Abhimanyu K. Varde, Portland, OR (US); Barry E. Huntley, Hillsboro, OR (US); Michael W. Chynoweth, Placitas, NM (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/914,343

(22) Filed: Jun. 27, 2020

(65) Prior Publication Data

US 2021/0406019 A1    Dec. 30, 2021

(51) Int. Cl.
*G06F 9/30* (2018.01)
*G06F 9/38* (2018.01)

(52) U.S. Cl.
CPC ...... *G06F 9/30145* (2013.01); *G06F 9/30043* (2013.01); *G06F 9/3865* (2013.01);
(Continued)

(58) Field of Classification Search
CPC . G06F 9/30036; G06F 9/30112; G06F 9/3879
See application file for complete search history.

(56) References Cited

U.S. PATENT DOCUMENTS 5,623,650 A * 4/1997 Beard ................. G06F 9/3804
 712/E9.055
5,781,763 A * 7/1998 Beukema ............ G06F 13/4013
 710/22

(Continued)

FOREIGN PATENT DOCUMENTS

WO    2012/138952 A1    10/2012
WO    2013/100992 A1     7/2013

OTHER PUBLICATIONS

European Search Report and Search Opinion, EP App. No 20208288.9, dated May 17, 2021, 08 pages.
(Continued)

*Primary Examiner* — Zachary K Huson
(74) *Attorney, Agent, or Firm* — Nicholson De Vos Webster & Elliott LLP

(57) ABSTRACT

Systems, methods, and apparatuses relating to an instruction for operating system transparent instruction state management of new instructions for application threads are described. In one embodiment, a hardware processor includes a decoder to decode a single instruction into a decoded single instruction, and an execution circuit to execute the decoded single instruction to cause a context switch from a current state to a state comprising additional state data that is not supported by an execution environment of an operating system that executes on the hardware processor.

24 Claims, 23 Drawing Sheets

(52) U.S. Cl.
CPC ...... *G06F 9/30036* (2013.01); *G06F 9/30112* (2013.01); *G06F 9/3879* (2013.01)

(56) References Cited

U.S. PATENT DOCUMENTS

| | | | |
|---|---|---|---|
| 10,120,691 B2 | 11/2018 | Ginzburg et al. | |
| 2009/0031310 A1* | 1/2009 | Lev | G06F 9/466 |
| | | | 718/101 |
| 2009/0037911 A1* | 2/2009 | Ahuja | G06F 9/5044 |
| | | | 718/100 |
| 2015/0277880 A1* | 10/2015 | Gschwind | G06F 8/52 |
| | | | 717/159 |

OTHER PUBLICATIONS

Office Action, EP App. No. 20208288.9, dated Aug. 12, 2022, 6 pages.

\* cited by examiner

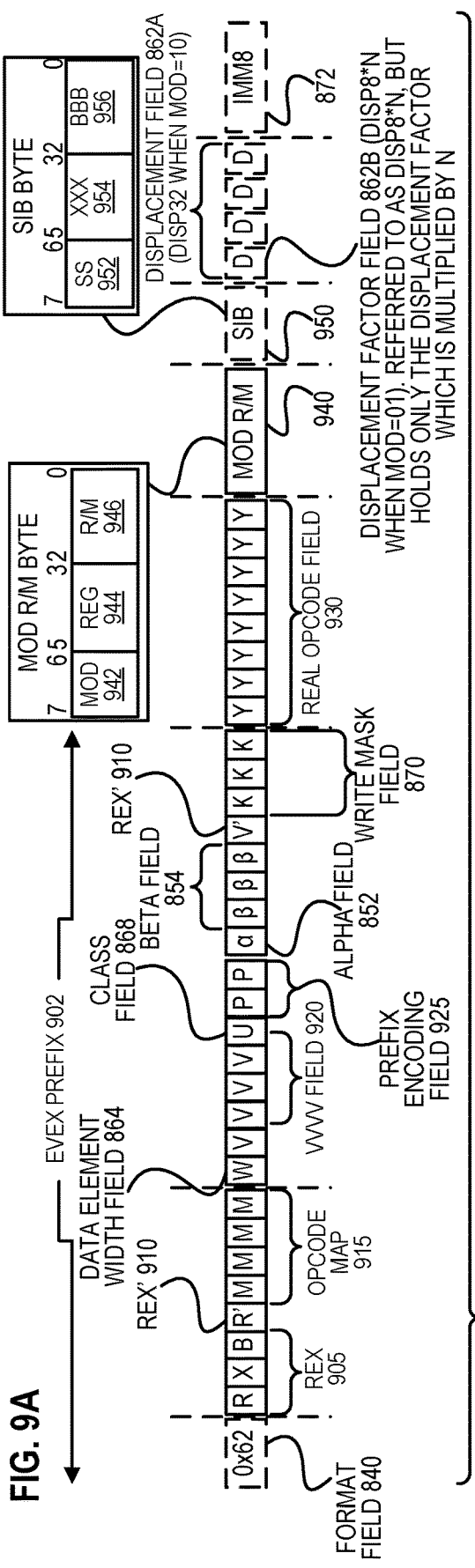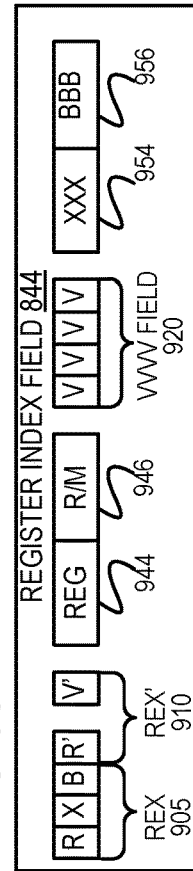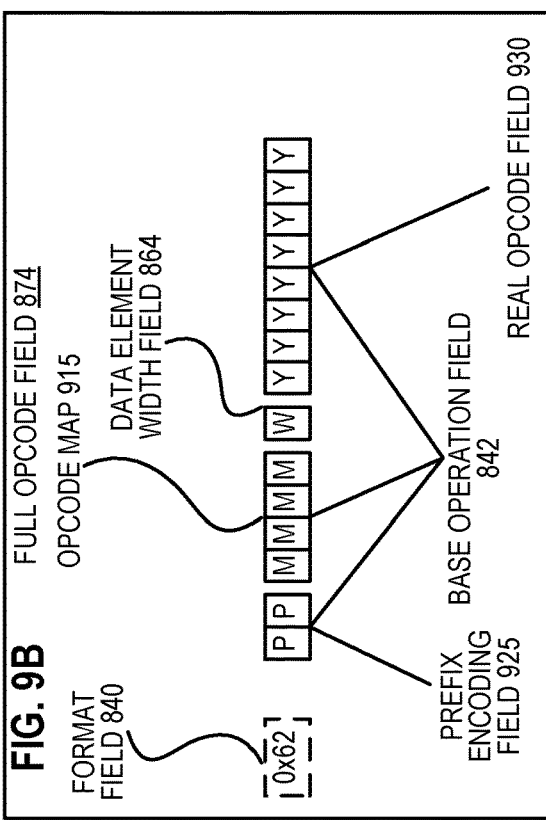

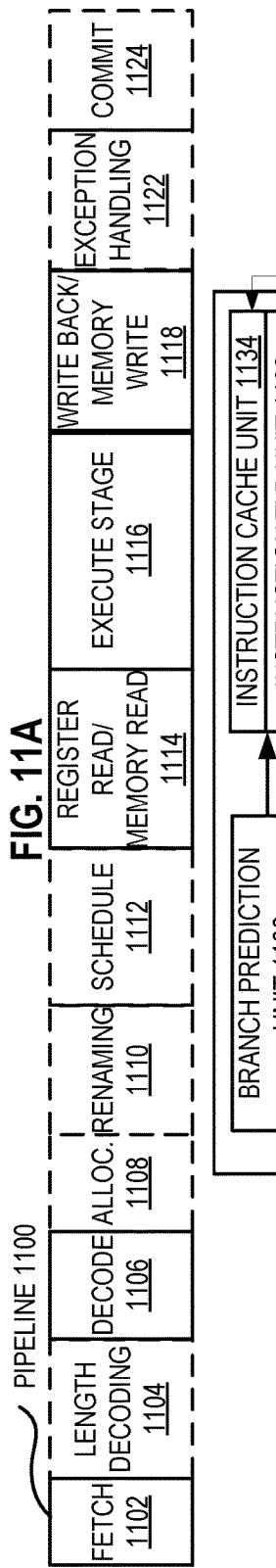
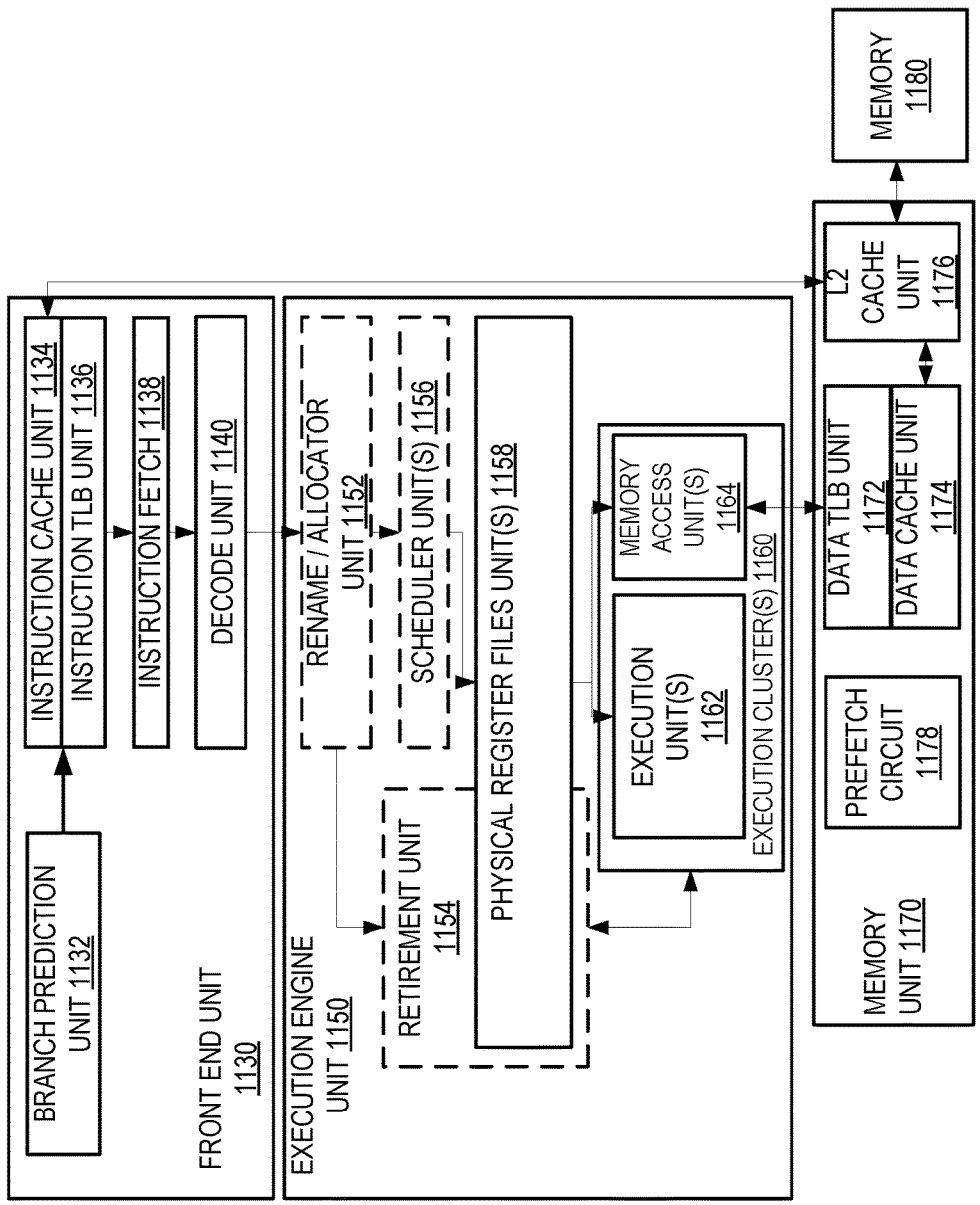
FIG. 11A
FIG. 11B

APPARATUSES, METHODS, AND SYSTEMS FOR INSTRUCTIONS FOR OPERATING SYSTEM TRANSPARENT INSTRUCTION STATE MANAGEMENT OF NEW INSTRUCTIONS FOR APPLICATION THREADS

TECHNICAL FIELD

The disclosure relates generally to electronics, and, more specifically, an embodiment of the disclosure relates to circuitry to implement an instruction for operating system transparent instruction state management.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9A is a block diagram illustrating fields for the generic vector friendly instruction formats in FIGS. 8A and 8B according to embodiments of the disclosure.

FIG. 9B is a block diagram illustrating the fields of the specific vector friendly instruction format in FIG. 9A that make up a full opcode field according to one embodiment of the disclosure.

FIG. 9C is a block diagram illustrating the fields of the specific vector friendly instruction format in FIG. 9A that make up a register index field according to one embodiment of the disclosure.

FIG. 11A is a block diagram illustrating both an exemplary in-order pipeline and an exemplary register renaming, out-of-order issue/execution pipeline according to embodiments of the disclosure.

FIG. 11B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
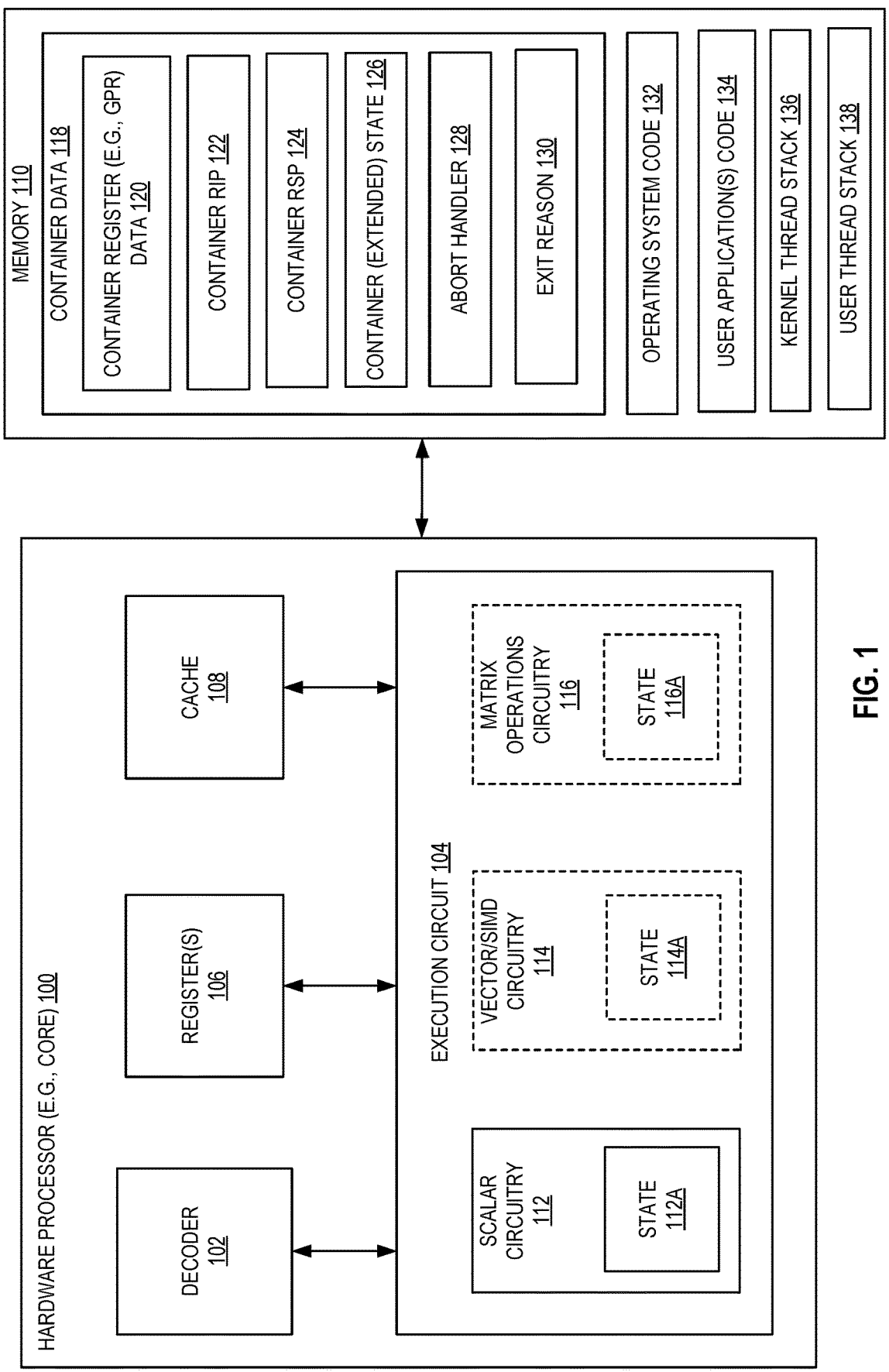
FIG. 1 illustrates a hardware processor coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software (e.g., a user application) may request an operation and a hardware processor (e.g., a core or cores thereof) may perform the operation in response to the request. In certain embodiments, an operating system (e.g., code) executing (e.g., operating in supervisor mode of a processor instead of a less privileged (e.g., user) mode) on a processor manages a switch from a first process (e.g., thread) to a second process (e.g., thread). This may be referred to as a context switch. For example, a context switch that includes storing the (e.g., processor) state of the first process (e.g., thread), so that it can be restored and execution resumed at a later time (for example, such that multiple processes share a single processor (e.g., core), e.g., under the control of a multitasking operating system). State information may include the current value(s) stored in a register(s) (e.g., and other values used by the process and/or maintained by the processor).

In certain embodiments, an (e.g., "new") (e.g., macro) instruction or instructions are enabled for (e.g., executable by) a hardware processor, but an operating system running on the hardware processor (e.g., an operating system that is managing the processes' execution) does not support those instruction(s), for example, the operating system has no visibility into at least a portion of state utilized by those instruction(s) (e.g., in contrast to the operating system supporting execution of those instruction(s)). This may occur when an operating system (e.g., version) was released before the instruction(s) (e.g., version) was released.

In one embodiment, a request (e.g., by an application) for an operating system to execute non-supported instruction(s) will cause an undefined instruction (UD) fault, for example, even if the processor itself is capable of executing the instruction (e.g., those instruction(s) are enabled for that processor, in contrast to being non-enabled). However, certain embodiments of operating systems manage a context switch from a first process (e.g., the state of the first process) to a second process (e.g., the state of the second process). Thus, in certain embodiments, instructions that rely on context switching and/or management of their state by the operating system (e.g., including "new" state that is not visible to the operating system) have a longer lead time to market and/or cannot be used by existing operating system(s) that have not enabled support for (e.g., all) the state of that instruction.

Embodiments herein allow for operating system transparent management of (e.g., instruction) state. Embodiments herein are directed to circuitry to implement an instruction for operating system transparent instruction state management. In one embodiment, the (e.g., user mode) instruction is callable (e.g., by a user mode application) when the processor is running in user mode, for example, not requiring the processor be in supervisor mode (e.g., not requiring an OS running in supervisor mode to request execution of the instruction). Embodiments herein allow an application running on (e.g., new) hardware on an (e.g., older) operating system to take advantage of new user mode instruction(s) (e.g., immediately) and gain performance and/or feature benefits of those instructions. Embodiments herein allow an application that is written to utilize instructions that use certain (e.g., new) hardware of a processor to actually use that hardware even without requiring an operating system running on the processor to be enabled for those instruction(s), e.g., such the application does not default back to legacy instruction(s) that do not use that hardware and/or have a (e.g., UD) fault. Embodiments herein are directed to one or more instructions that are manipulating the state in user mode, e.g., without any involvement from the OS (e.g., kernel). For example, such that embodiments herein migrate certain state for a thread wherein that state is not migrated with a thread by the OS. Embodiments herein provide the ability to run an application using one or more (e.g., new) instructions on an (e.g., older) OS that does not support the full instruction state of the hardware (e.g., execution circuitry) utilized by those one or more instructions. Embodiments herein provide for OS transparent instruction state management of (e.g., new) instructions for application threads.

Certain embodiments herein do not rely on an out of band (e.g., XSAVE) instruction, e.g., that requires an update to be sent to the software (e.g., OS) to enable the new state. Embodiments herein avoid the disadvantages of requiring: (i) that users update their software, whether that update is in the form of meta data or actual binaries, (ii) the OS vendor to agree on pushing out any updates, and/or (iii) limitations in OS state saving mechanisms (e.g., size limitations) that require software (e.g., OS) updates for certain features.

The instructions disclosed herein are improvements to the functioning of a processor (e.g., of a computer) itself. Instruction decode circuitry (e.g., a decoder) not having such an instruction as a part of its instruction set would not decode as discussed herein. An execution circuit not having such an instruction as a part of its instruction set would not execute as discussed herein. For example, a single instruction that, when a processor decodes the single instruction into a decoded single instruction and that decoded single instruction is executed by the processor, causes a context switch from a current state to a state comprising additional state data that is not supported by an execution environment of an operating system executing on the hardware processor.

FIG. 1 illustrates a hardware processor 100 coupled to a memory 110 according to embodiments of the disclosure. Depicted hardware processor 100 includes a hardware decoder 102 (e.g., decode unit or decode circuit) and a hardware execution circuit 104 (e.g., execution unit). Depicted hardware processor 100 includes register(s) 106. Registers may include one or more of registers to access (e.g., load and/or store) data in, e.g., additionally or alternatively to access (e.g., load or store) of data in memory 110. Depicted hardware processor 100 includes cache 108. Cache may include one or more cache banks to access (e.g., load and/or store) data in, e.g., additionally or alternatively to access (e.g., load or store) of data in memory 110 and/or register(s) 106. The decoder 102, execution circuit 104, registers 106, and/or cache 108 may be of a single core of the processor, e.g., and multiple cores each with an instance of the circuitry may be included. The processor (e.g., and core thereof) may be a processor and/or core according to any of the disclosure herein.

In certain embodiments, execution circuit 104 includes scalar circuitry 112, vector/single instruction, multiple data (SIMD) circuitry 114, and/or matrix operations circuitry 116. In one embodiment, matrix operations circuitry includes a two-dimensional grid of multiplier circuits (e.g., fused multiply-add circuits), a first plurality of registers that represents a first two-dimensional (e.g., input) matrix coupled to the matrix operations accelerator circuit, a second plurality of registers that represents a second two-dimensional (e.g., input) matrix coupled to the matrix operations accelerator circuit, and/or a third plurality of registers that represents a third two-dimensional (e.g., output) matrix coupled to the matrix operations accelerator circuit. In certain embodiments, only one or any combination of scalar circuitry 112, vector/single instruction, multiple data (SIMD) circuitry 114, and/or matrix operations circuitry 116 may be present (e.g., utilized). In certain embodiments, scalar circuitry 112 operates on scalar values (e.g., single numbers), e.g., and has a state 112A associated with the scalar circuitry 114 (e.g., state 112A used in a context switch affecting scalar circuitry 112). In certain embodiments, vector/SIMD circuitry 114 operates on vector or packed data values, e.g., and has a state 114A associated with vector/SIMD circuitry 114 (e.g., state 114A used in a context switch affecting vector/SIMD circuitry 114). In certain embodiments, matrix operations circuitry 116 operates on one or more matrices, e.g., and has a state 116A associated with the matrix operations circuitry 116 (e.g., state 116A used in a context switch affecting matrix operations circuitry 116). Matrix operations circuitry 116 may be included in a core or as an (e.g., external) accelerator. State 112A, state 114A, and/or state 116A may include registers that are separate from any other registers, e.g., separate from registers 106 (e.g., general purpose registers (GPRs)).

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decoder 102 may receive an (e.g., single) instruction (e.g., macro-instruction) and decode the instruction, e.g., into micro-instructions and/or micro-operations. Hardware execution circuit 104 may execute the decoded instruction (e.g., macro-instruction) to perform an operation or operations. For example, an instruction to be decoded by decoder 102 and for the decoded instruction to be executed by execution circuit 104 may be any instruction discussed herein, e.g., in FIGS. 2B-6.

Certain embodiments herein are directed to a processor that includes an (e.g., user mode) instruction in its instruction set that performs an operation to move container data 118 (e.g., container (e.g., extended) state 126) into processor 100 (e.g., into state storage of execution circuit 104, e.g., one or more of state 112A of scalar circuitry 112, state 114A of vector/single instruction, multiple data (SIMD) circuitry 114, and/or state 116A of matrix operations circuitry 116). For example, operating system code 132 may not support execution of an instruction that utilizes vector/single instruction, multiple data (SIMD) circuitry 114 and/or matrix operations circuitry 116, for example, where state 114A and/or state 116A, respectively, are not visible to operating system code 132. Thus, certain embodiments herein allow other code (e.g., user application(s) code 134) to utilize vector/single instruction, multiple data (SIMD) circuitry 114 and/or matrix operations circuitry 116 (e.g., as caused by one or more sets of corresponding instructions), and more particularly, allow use of a container as discussed herein. In one embodiment, an instruction causes a hardware processor 100 (e.g., core) to utilize a user mode managed state area that supports state management for an additional instruction not supported by the operating system.

For example, a single instruction that, when a processor decodes the single instruction into a decoded single instruction and that decoded single instruction is executed by the processor, causes a context switch from a current state to a state comprising additional state data that is not supported by an execution environment of an operating system executing on the hardware processor.

The additional state data may be the state of certain hardware supported "extensions" to an instruction set architecture's (ISA's) traditional instruction set. For example, the state for the hardware the supports an ISA's: floating point instructions (e.g., "x87" instructions), 128 bit vector instructions (e.g., "SSE" instructions), (e.g., 256 bit or 512 bit) vector instructions with 3 operand instruction format (e.g., "AVX" instructions), and/or matrix instructions (e.g., "matrix accelerator" instructions), for example, with each set of instructions viewed as separate "extensions" to the ISA's traditional instruction set (e.g., "x86" instructions).

In one embodiment, a control register (e.g., XCR0) that is internal to the processor is written to by software to enable any one or more extensions. For example, with a control register maintaining one bit for each the candidate extensions. Software (e.g., the operating system (OS)) may permit the individual setting of the various bits to individually enable extensions according to its own intentions. A control register may have additional, currently undefined bit positions, so that additional extensions can be added in the future and enabled/disabled accordingly. In certain embodiments, enabled extension(s) may have the state for their underlying hardware moved (e.g., for a context switch) by user application code 132, e.g., to move their state from container data 118 (e.g., extended state 126) into the state storage elements (e.g., registers, buffers, etc.) of the processor 100. Memory 110 may include a kernel thread stack 136 (e.g., for use by operating system code 132) and/or a user thread stack 138 (e.g., for use by user application code 134). Register 106 may include current privilege level (CPL) storage that is updated by the processor with the current privilege level that the processor is operating in (for example, user mode (e.g., CPL=3) or supervisor mode (e.g., CPL<3)).

In certain embodiments, one or more of the following components may be utilized: (1) a new (e.g., AX_Enter) instruction that will, when executed, perform a context switch in user mode from the current state to a state that includes additional state not available otherwise and the ability to execute (e.g., in an ISA container) an additional instruction(s) not (e.g., previously) supported in an (e.g., existing) execution environment (e.g., execution environment context) of the OS, (2) a new (e.g., AX_Abort) instruction that will, when executed, cause an exit of the ISA container, e.g., to the abort handler with a user defined error code, (3) a container state area that is a user mode managed state area that defines an ISA execution environment that supports state management of additional instruction(s) not currently supported by the underlying OS, and/or (4) an abort handler comprising a helper location to assist in managing state and aborting the ISA container execution environment in user mode.

In certain embodiments, a container execution environment utilizes one or more of the following items of container data 118 (e.g., with that data belonging to a state that was removed from hardware in a context switch): register (e.g., general purpose register (GPR)) data 120, (e.g., next)

instruction pointer (e.g., RIP) 122, return stack pointer 124 (RSP), (e.g., extended) state 126, abort handler 128 (e.g., a pointer to an abort handler routine), and exit reason 130.

Figure 2A:
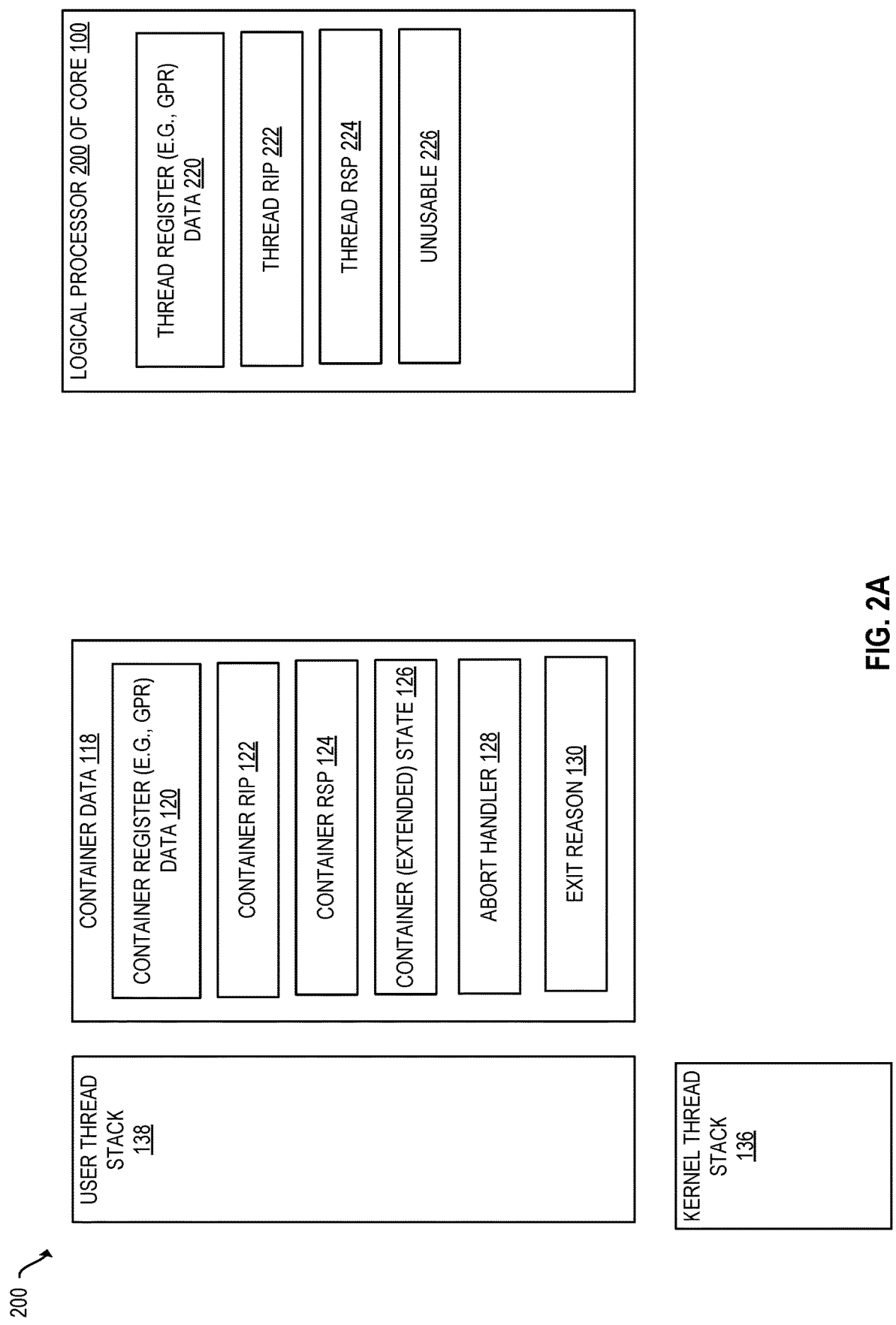
FIG. 2A illustrates example fields of container data according to embodiments of the disclosure.

FIG. 2A illustrates example fields of container data 118 according to embodiments of the disclosure. In certain embodiments, a logical processor 200 of processor 100 (e.g., of a core of processor 100) includes register(s) 220 used by a thread executing on logical processor 200, a (e.g., next) instruction pointer (e.g., RIP) 222 for the thread, a return stack pointer 224 (RSP) for the thread, and a currently unusable 226 portion of (e.g., extended) state 126 (e.g., because the OS has no visibility into that actual state within the logical processor 200). For example, the extended state being currently "unusable" as the operating system does not support the state and as such any instruction that used that state would currently (e.g., #UD) fault upon a request for execution. Container data 118 may include a field for a particular (e.g., extended) state that is to be utilized (e.g., "opted into"), for example, and if that state is not enabled for the processor (e.g., core), then execute an abort handler. In one embodiment, a processor includes multiple heterogeneous cores (e.g., with one core having certain hardware and its associated extended state that a second core does not include). In certain embodiments, the data within container data 118 is populated by an (e.g., user) application that is to use the container or a library that encapsulates that application.

Figure 2B:
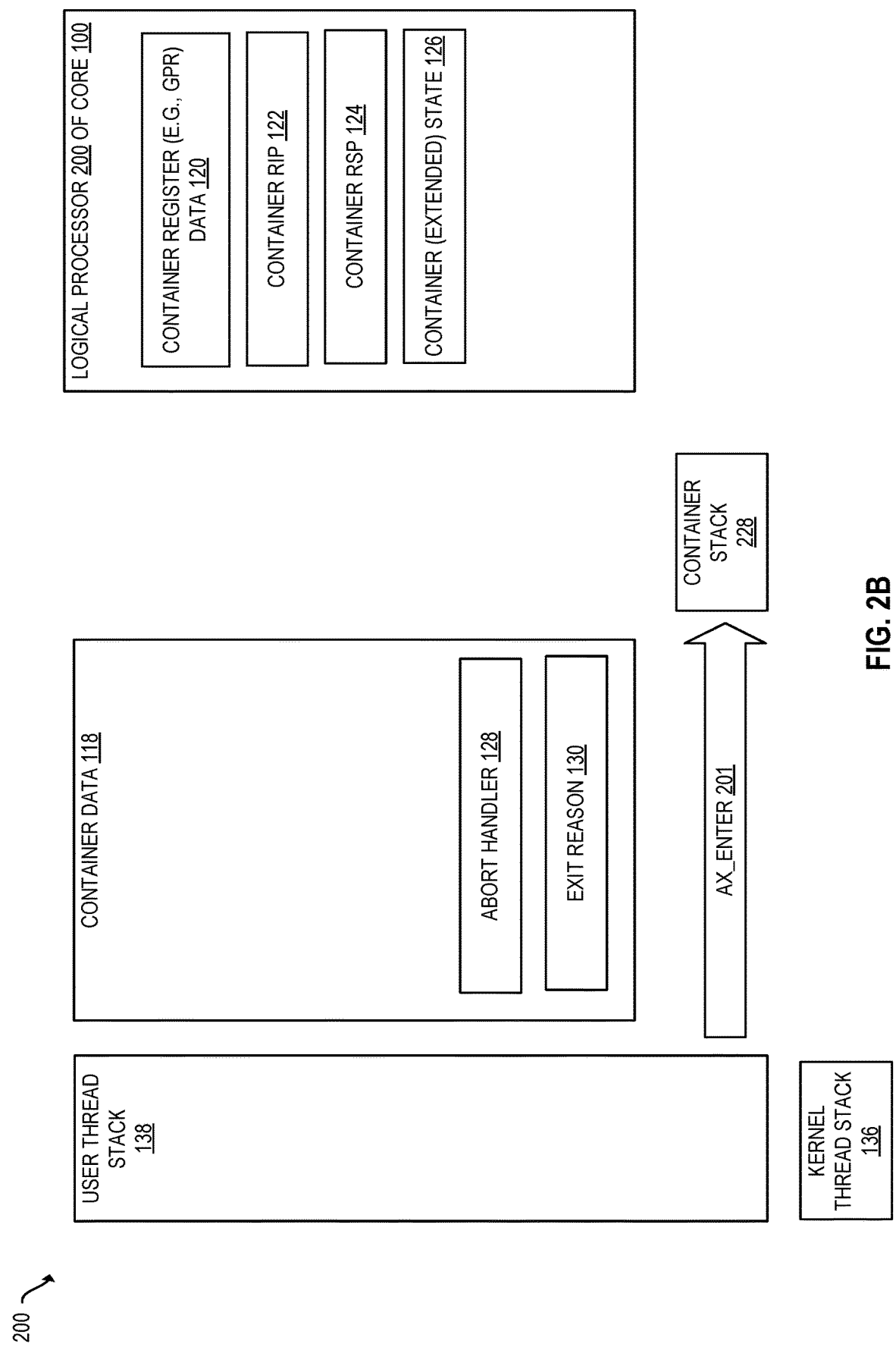
FIG. 2B illustrates example data movement after executing an "AX_Enter" instruction according to embodiments of the disclosure.

FIG. 2B illustrates example data movement after executing an "AX_Enter" instruction 201 (e.g., using the container state area) according to embodiments of the disclosure. In certain embodiments, the processor (e.g., at the request of a user mode application) may then begin executing code within the container corresponding to container data 118. For example, with execution of the "AX_Enter" instruction 201 causing a transfer of control into the container by populating the GPRs, enabling the instructions for the extended state (e.g., updating a control register (e.g., XCR0)) along with updating the extended ISA state and then switching to the current RSP and RIP of the container. In certain embodiments, all page faults are resolved and the container data pages (e.g., in a multiple paged memory management scheme) are locked into a translation lookaside buffer (TLB) of the processor to ensure that any eviction event would exit the container first.

In the depicted embodiment, execution of AX_Enter" instruction 201 (e.g., having a field that indicates container data 118) causes the values from container register 120, container RIP 122, container RSP 124, and container (e.g., extended) state 126 to be input into logical processor 200. For example, with the data (e.g., state) that was within logical processor 200 being saved elsewhere (e.g., by the OS). In certain embodiments, the execution of AX_Enter" instruction 201 causes a use of container stack 228, e.g., instead of user thread stack 138 or (e.g., OS) kernel thread stack 136. The abort handler 128 (e.g., a pointer to an abort handler routine) and exit reason 130 are unused at this point in certain embodiments.

Figure 2C:
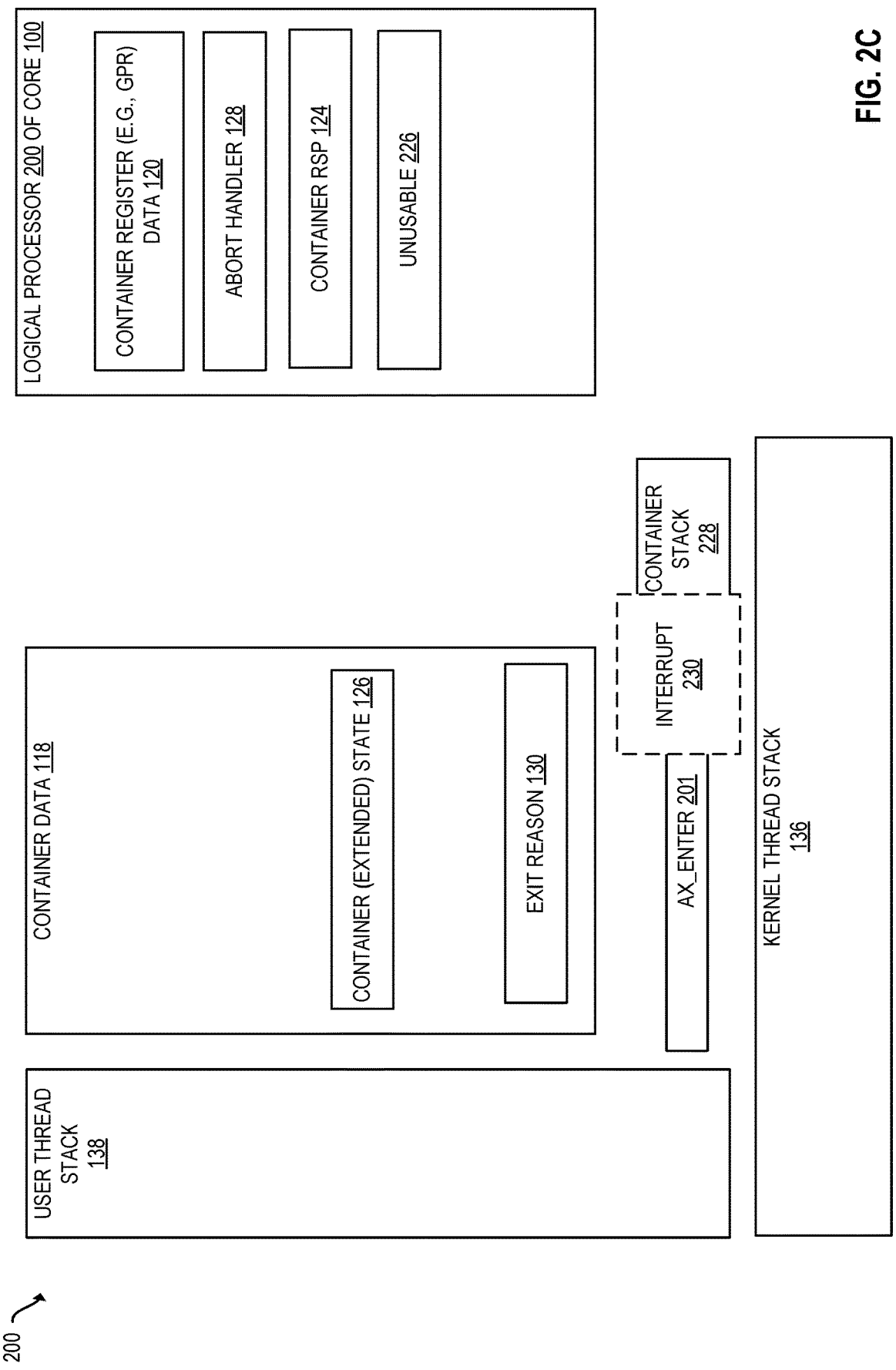
FIG. 2C illustrates example data movement for an interrupt after executing an "AX_Enter" instruction according to embodiments of the disclosure.

FIG. 2C illustrates example data movement for an interrupt 230 after executing an "AX_Enter" instruction 201 according to embodiments of the disclosure. In the depicted embodiment, the abort handler 128 (e.g., a pointer to the abort handler) is moved into (e.g., RIP storage of) logical processor 200 to cause the execution of the abort handler and the current container (e.g., extended) state 126 is moved back into container 118 (e.g., as that state is not visible here to the OS operating here and thus will not be saved by the OS during this process).

Figure 2D:
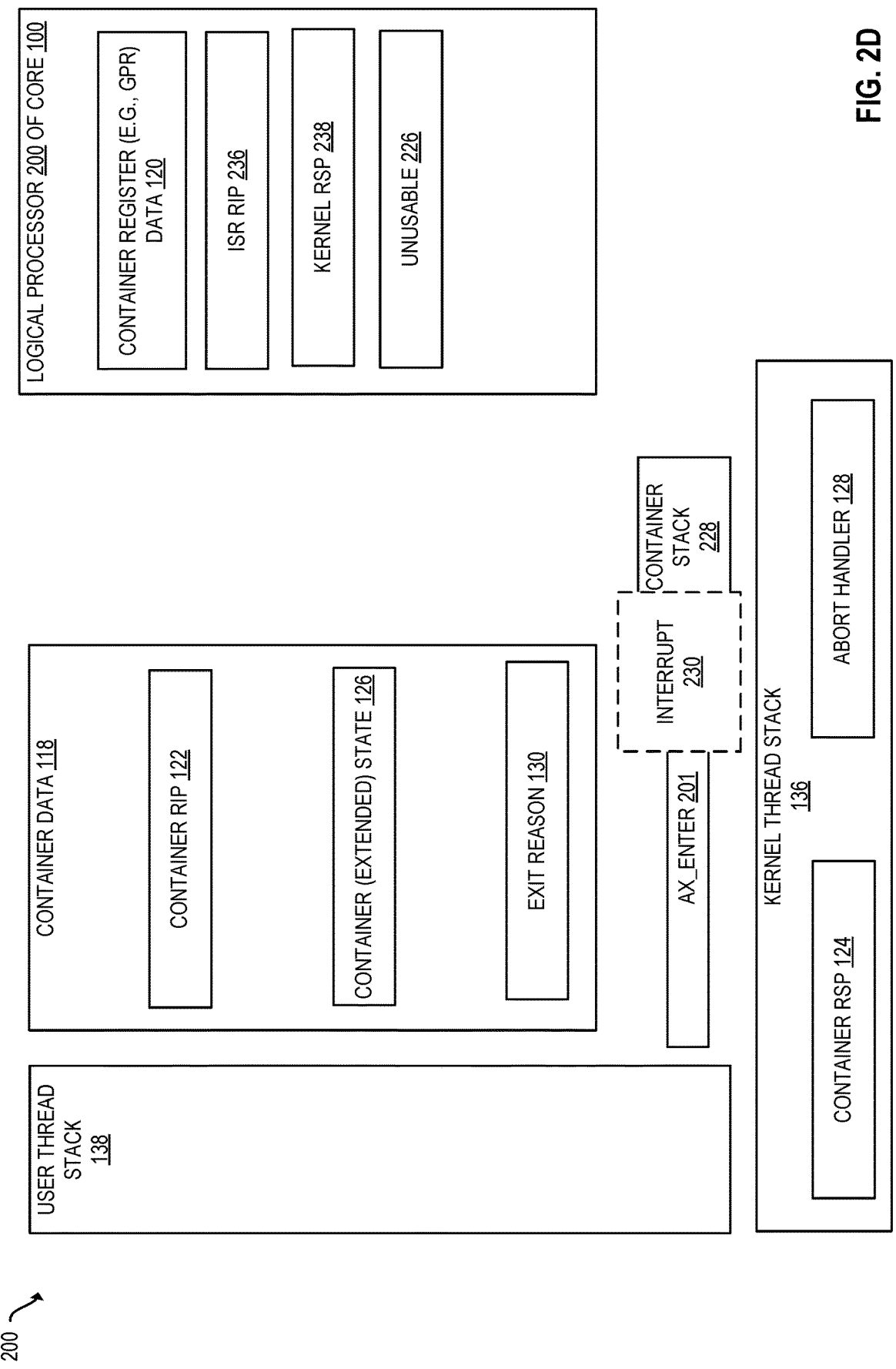
FIG. 2D illustrates example data movement for an abort handler servicing an interrupt after executing an "AX_Enter" instruction according to embodiments of the disclosure.

FIG. 2D illustrates example data movement for an abort handler 128 servicing an interrupt 230 after executing an "AX_Enter" instruction 201 according to embodiments of the disclosure. In certain embodiments, processor 200 executes the abort handler 128 which then causes the container RIP 122 to be saved into container data 118, an interrupt service routine (ISR) instruction pointer (e.g., RIP) 236 to be moved into (e.g., RIP storage of) logical processor 200 to cause the execution of the ISR, the container RSP 124 to be pushed onto the kernel thread stack 136, kernel RSP 238 to be moved into (e.g., RSP storage of) logical processor 200 storing a return address of the abort handler, and/or the abort handler 128 (e.g., a pointer to the abort handler) to be pushed onto the kernel thread stack 136.

In certain embodiments, on return to the abort handler 128, the abort handler 128 will update the container register 120 and switch back to the original stack (e.g., user thread stack 138), e.g., and then execute an "AX_Enter" instruction 201 to re-enter the container.

For example, a triggering event may occur that would cause the container to be interrupted 230. In certain embodiments, the hardware (e.g., logical processor 200) would save the current RIP 122 into the container and update the RIP to the abort handler 128. In certain embodiments, the abort handler does not always execute, e.g., unless this was an Ax_Exit instruction) and instead the event would be delivered such as the interrupt. In certain embodiments, the stack would not be switched in order to support a system call (SYSCALL) where parameters could be on the stack. In certain embodiments, the extended ISA state 126 may be saved but it is possible to have a lazy state save as discussed further below. In certain embodiments, the other registers (e.g., GPRs) do not need to be saved as they will be saved by the abort handler where the OS is already ensuring that GPRs are not leaking across threads.

Figure 3:
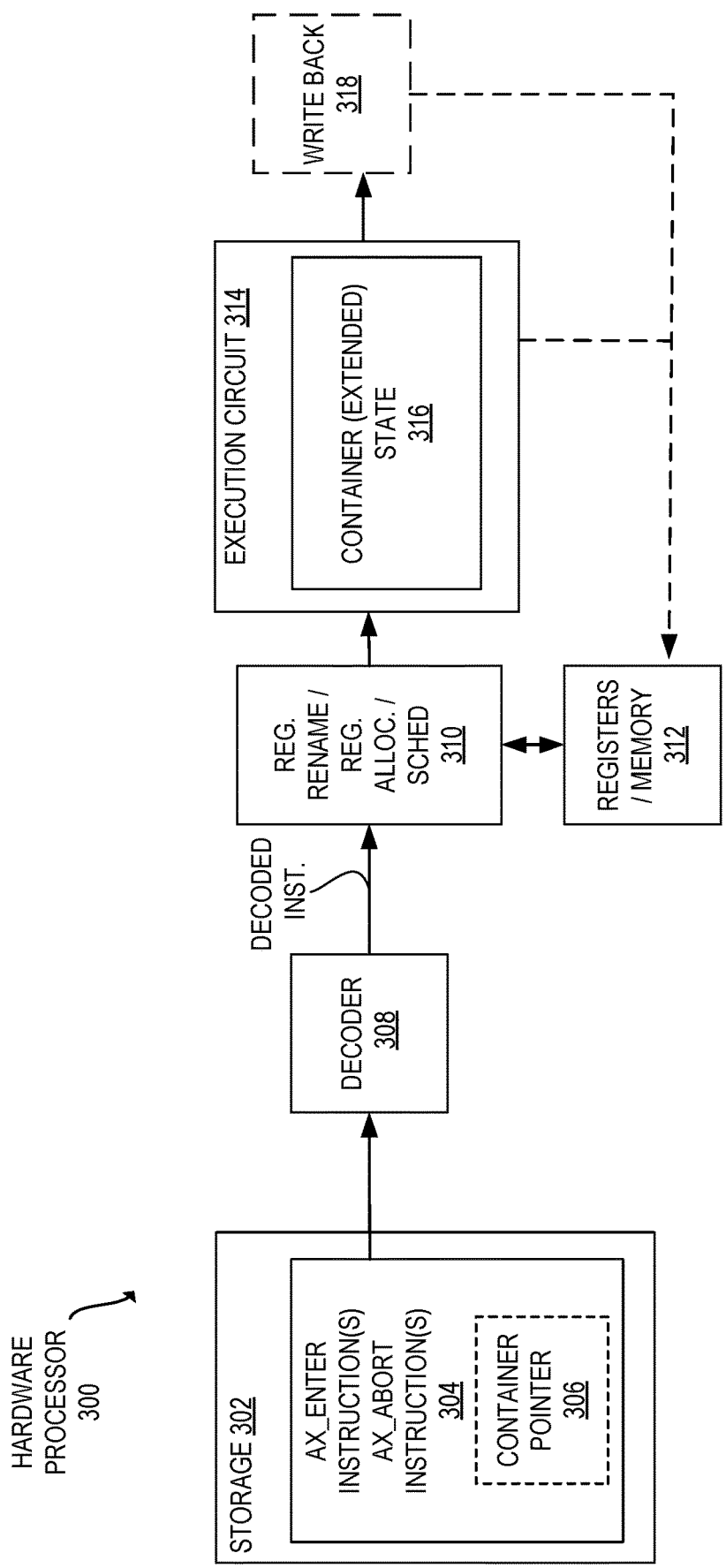
FIG. 3 illustrates a hardware processor coupled to storage that includes one or more "AX_Enter" and/or "AX_Abort" instructions according to embodiments of the disclosure.

FIG. 3 illustrates a hardware processor 300 coupled to storage 302 that includes one or more "AX_Enter" and/or "AX_Abort" instructions 304 according to embodiments of the disclosure. In certain embodiments, "AX_Enter" and/or "AX_Abort" instructions 304 are according to any of the disclosure herein. In one embodiment, an "AX_Enter" instruction includes a container pointer 306 to indicate container data (e.g., container (extended state) storage area) as discussed herein.

In one embodiment, e.g., in response to a request to perform an operation, the instruction (e.g., macro-instruction) is fetched from storage 302 and sent to decoder 308. In the depicted embodiment, the decoder 308 (e.g., decoder circuit) decodes the instruction into a decoded instruction (e.g., one or more micro-instructions or micro-operations). The decoded instruction is then sent for execution, e.g., via scheduler circuit 310 to schedule the decoded instruction for execution.

In certain embodiments, (e.g., where the processor/core supports out-of-order (OoO) execution), the processor includes a register rename/allocator circuit 310 coupled to register file/memory circuit 312 (e.g., unit) to allocate resources and perform register renaming on registers (e.g., registers associated with the initial sources and final destination of the instruction). In certain embodiments, (e.g., for out-of-order execution), the processor includes one or more scheduler circuits 310 coupled to the decoder 308. The scheduler circuit(s) may schedule one or more operations associated with decoded instructions, including one or more operations decoded from an "AX_Enter" or "AX_Abort" instructions 304, e.g., for execution on the execution circuit 314.

As one example, a decoded "AX_Enter" multiplication instruction 304 is to cause a context switch from a current state to a state comprising additional state data 316 that is not supported by an execution environment of an operating system executing on the hardware processor, e.g., and is to cause entry into a user mode managed state area.

As another example, a decoded "AX_Abort" multiplication instruction 304 is to cause an exit from the user mode managed state area.

In certain embodiments, a write back circuit 318 is included to write back results of an instruction to a destination (e.g., write them to a register(s) and/or memory), for example, so those results are visible within a processor (e.g., visible outside of the execution circuit that produced those results).

One or more of these components (e.g., decoder 308, register rename/register allocator/scheduler 310, execution circuit 314, registers (e.g., register file)/memory 312, or write back circuit 318) may be in a single core of a hardware processor (e.g., and multiple cores each with an instance of these components).

In one embodiment, a user mode managed state area is a container state area. In certain embodiments, container data (e.g., container state area) includes one or more of the following items from Table 1.

TABLE 1

Example Container Data

| Field | Description |
|---|---|
| Feature Bits | The set of features to request to make available in the container. |
| AbortRIP | The RIP to execute when resuming from either a direct abort of the container or an interruption such as an interrupt. |
| SaveRSP | Thread RSP before entering the container. |
| ContainerRIP | The current RIP location inside the container. |
| ContainerRSP | The current RSP location inside the container. |
| GPR/Flags Area | The area to restore the GPRs on entry to the container. |
| Extended Area | Additional and new ISA instruction area. |
| Exit Reason | This is the reason for the exit of the container. |
| TSC Deadline | This is a pre-emption counter to force to the abort handler on a timed boundary (optional, see Scheduling Timer below). |
| Active | Optional bit flag that indicates if the container is active (e.g., used for lazy state save before software could re-schedule a de-scheduled container on another core (e.g., CPU)). |

An (e.g., user mode) application may maintain a set of containers, e.g., and it may use a thread pool to execute each container. In certain embodiments, a container is not tied to a specific thread but allowed to migrate and be scheduled between threads provided that software maintains the container pool appropriately, e.g., without any operating system (OS) enablement required.

Figure 4:
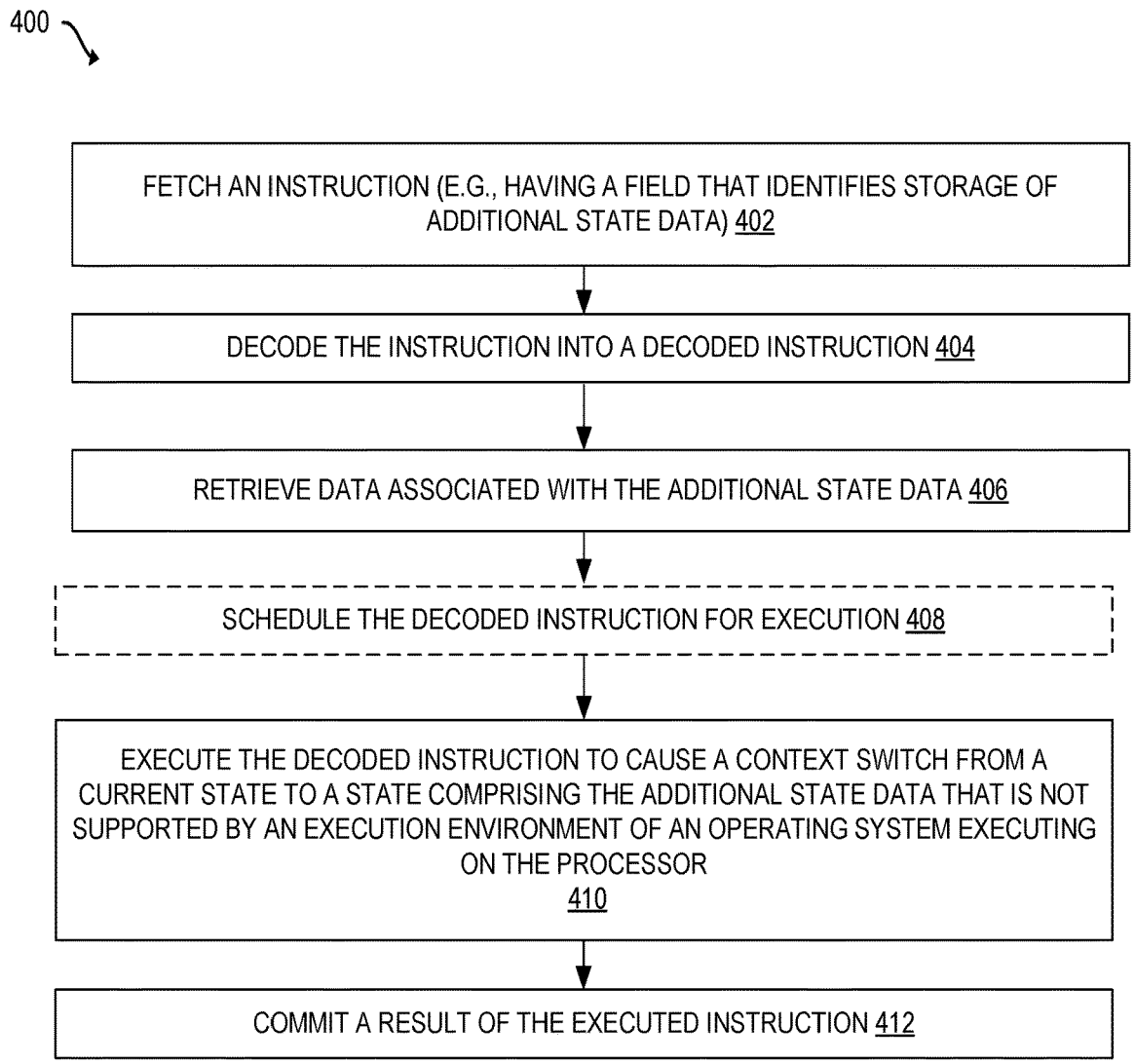
FIG. 4 illustrates a method of processing an "AX_Enter" instruction according to embodiments of the disclosure.

FIG. 4 illustrates a method of processing an "AX_Enter" instruction according to embodiments of the disclosure. A processor (e.g., or processor core) may perform method 400, e.g., in response to receiving a request to execute an instruction from software. Depicted method 400 includes processing an "AX_Enter" instruction by: fetch an instruction (e.g., having a field that identifies storage of additional state data (e.g., container data)) 402, decode the instruction into a decoded instruction 404, retrieve data associated with the additional state data 406, (optionally) schedule the decoded instruction for execution 408, execute the decoded instruction to cause a context switch from a current state to a state comprising the additional state data that is not supported by an execution environment of an operating system executing on the processor 410, and commit a result of the executed instruction 412.

Figure 5:
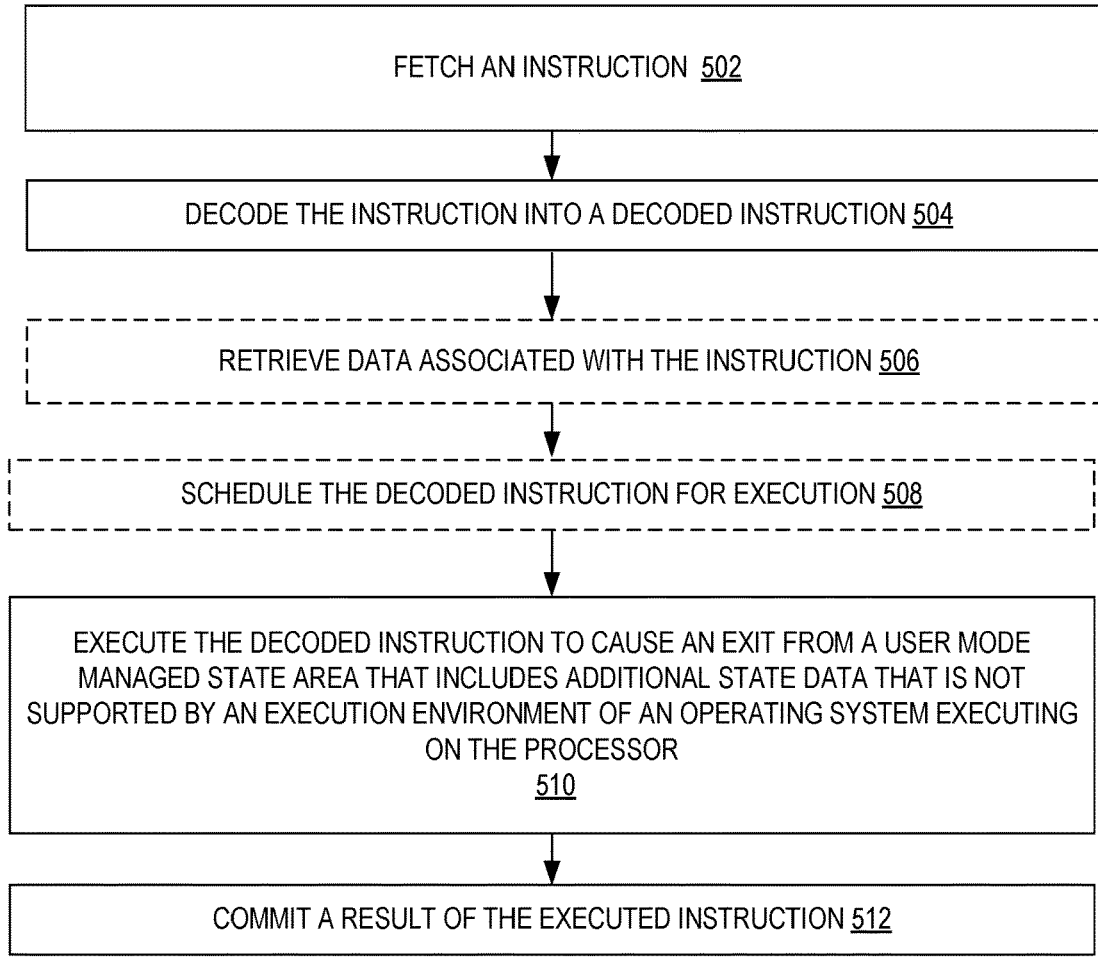
FIG. 5 illustrates a method of processing an "AX_Abort" instruction according to embodiments of the disclosure.

FIG. 5 illustrates a method of processing an "AX_Abort" instruction according to embodiments of the disclosure. A processor (e.g., or processor core) may perform method 500, e.g., in response to receiving a request to execute an instruction from software. Depicted method 500 includes processing an "AX_Abort" instruction by: fetch an instruction 502, decode the instruction into a decoded instruction 504, (optionally) retrieve any data associated with the instruction 506, (optionally) schedule the decoded instruction for execution 508, execute the decoded instruction to cause an exit from a user mode managed state area that includes additional state data that is not supported by an execution environment of an operating system executing on the processor 510, and commit a result of the executed instruction 512. The result may be an error return code (e.g., stored as a value into exit reason 130 of container data 118) from an abort handler, e.g., that indicates a reason for the return. In certain embodiments, "AX_Abort" instruction takes as an input operand of an abort reason from software (e.g., is the abort a user requested abort, an interrupt, an exception, etc.). In certain embodiments, an "AX_Abort" instruction generates the user requested abort reason with the user supplied value, for example, where interrupts, exceptions, etc. would be transparent aborts without usage of the "AX_Abort" instruction.

Figure 6:
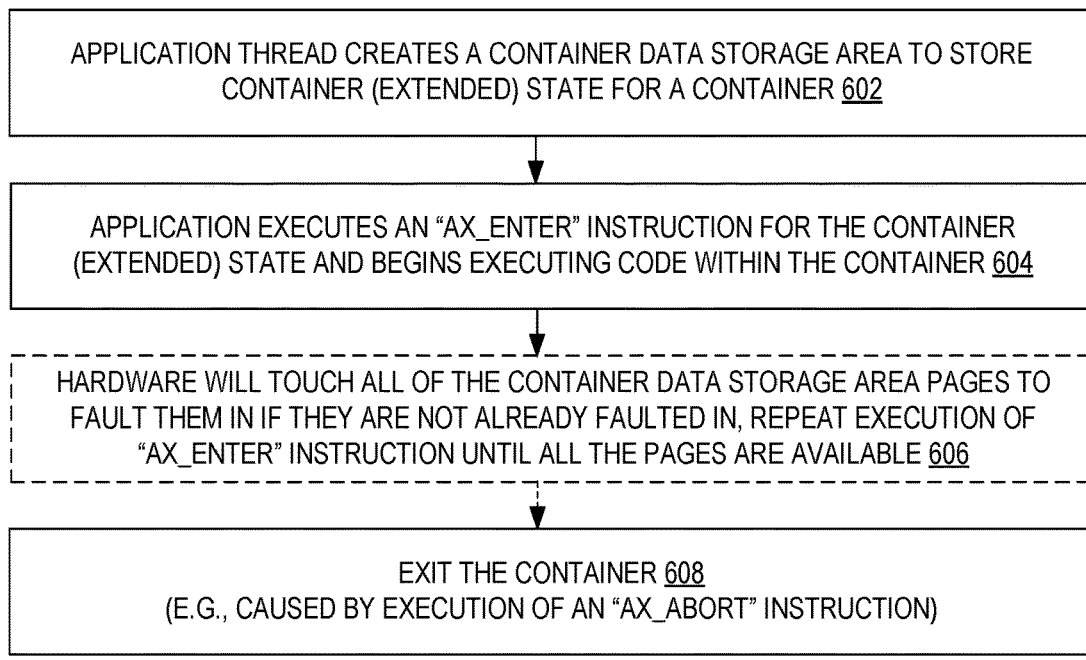
FIG. 6 is a flow diagram illustrating operations of a method for utilizing container (e.g., extended) state according to embodiments of the disclosure.

FIG. 6 is a flow diagram 600 illustrating operations of a method for utilizing container (e.g., extended) state according to embodiments of the disclosure. Depicted flow 600 includes an application thread creating a container data storage area to store container (extended) state for a container 602, application executing an "AX_Enter" instruction for the container (extended) state and beginning executing code within the container 604, hardware will touch all of the container data storage area pages to fault them in if they are not already faulted in, repeat execution of "AX_Enter" instruction until all the pages are available 606, and exit the container 608 (e.g., caused by execution of an "AX_Abort" instruction, other exit event (e.g., interrupts, exceptions, etc.), or unsupported features (e.g., hardware) being requested for use in the container).

Figure 7:
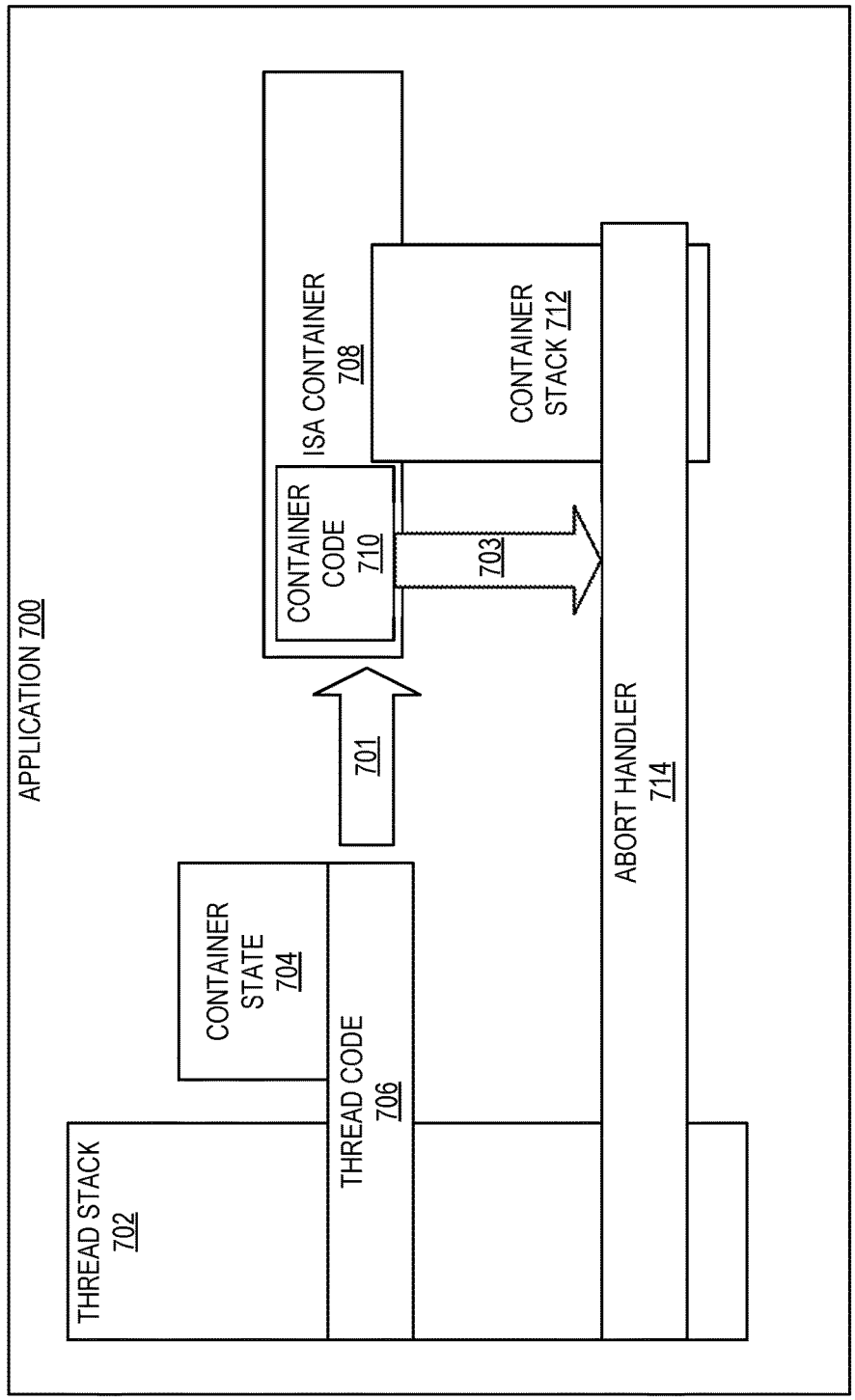
FIG. 7 is a block diagram illustrating components in an (e.g., user mode) application utilizing container (e.g., extended) state according to embodiments of the disclosure.

FIG. 7 is a block diagram illustrating components in an (e.g., user mode) application 700 utilizing container (e.g., extended) state 704 according to embodiments of the disclosure. As another example, a flow includes the following example steps:

1. An application thread 706 (e.g., using thread stack 702) will create a container state 704 area.
2. The application will then execute an Ax_Enter instruction 701 using the container state area 704 and begin executing code 710 within the container 708 (e.g., using the container stack 712).
   2.1 In certain embodiments, the hardware will touch all of the container state area pages to add (e.g., fault) them in if they are not already added (e.g., faulted) in. This will cause Ax_Enter instruction 701 to continue to be re-executed until all pages are available.
3. At some point, in certain embodiments the container will cause an exit.
   3.1 This can be due to the application calling an "Ax_Abort" instruction 703.
   3.2 This can be due to some external event (e.g., non-maskable interrupt (NMI), Interrupt, Machine Check Abort (#MC), etc.).

3.3 This can be due to an exception within the container (e.g., page fault exception (#PF), general protection fault (#GP), etc.).
3.4 This can be due to the container calling a system call (e.g., SYSCALL)
3.5 This can be due to some virtual machine (VM) exit reason.
3.6 Some events may require special handling (e.g., a remote action request (RAR) event).
  A. A RAR (e.g., that causesa a TLB flush without exiting an OS kernel) may either save the state, perform RAR and then exit to the abort handler or it could attempt to re-capture the pages after RAR and if successful simply continue execution.
4. The container will save the container's current RIP in the save area and restore the RIP to the Abort Handler.
5. The container will save the extended instruction state and optionally the GPRs (or the GPRs can be left up to the abort handler).
6. The container will not switch stacks on exiting the container (e.g., the abort handler 714 uses the container stack 712), this is to support SYSCALL.
  6.1 Optionally, the container does not switch stacks on SYSCALL, but for any other event it could save/restore.
7. The 'exit reason' is populated into the container state 704 area.
8. If this is due to execution of an "Ax_Abort" instruction, the system will start executing the abort handler 714; else if this is due to another event the system will now transfer to that event.
9. Once the event completes or an Ax_Abort instruction is executed; flow now returns to execute the abort handler.
10. The abort handler 714 may:
  10.1 Save the GPRs if they are lazy save (or update them if this was a SYSCALL),
  10.2 Restore the stack to the thread stack,
  10.3 Process the exit reason, and/or
  10.4 Determine what to do next. It could enter the same container again or it could enter another container. If executing a container, certain embodiments herein loop back up to 2.

In certain embodiments, a scheduling timer is utilized. For example, adding a pre-emption timer to the container (for example, within container data storage, e.g., container data 118 in FIG. 1 or container state 704 in FIG. 7) such that when the cycle count hits, a pre-emption of the container occurs and the container execution exits directly to the abort handler, for example, to allow for a single user mode thread to multi-task multiple containers within its own quantum.

As another example, a flow includes the following example steps:
1. An application maintains a list of ISA State Containers.
2. A pool of worker threads will then look for work and a thread will retrieve one of the containers.
3. The thread will program the container to use a subset (e.g., ⅓) of its quantum by setting a timer state container deadline in the container save area.
4. The application is then to execute an Ax_Enter instruction using the container state area and begin executing code within the container.
  a. In certain embodiments, the hardware will touch all of the container state area pages to add (e.g., fault) them in if they are not already added (e.g., faulted) in. This will cause an Ax_Enter instruction to continue to be re-executed until all pages are available.

5. The container may then exit due to any of the following reasons.
  a. This can be due to the application calling an "Ax_Abort" instruction.
  b. This can be due to some external event (NMI, Interrupt, #MC, etc.).
  c. This can be due to an exception within the container (#PF, #GP, etc.).
  d. This can be due to the container calling SYSCALL.
  e. This can be due to VM Exit reason.
  f. This can be due to the Deadline Timer.
  g. Some events may require special handling (e.g., RAR)
    i. RAR may either save the state, perform RAR and then exit to the abort handler OR it could attempt to re-capture the pages after RAR and if successful simply continue execution.
6. The container will save the container's current RIP in the save area and restore the RIP to the Abort Handler.
7. The container will save the extended instruction state and optionally the GPRs (or the GPRs can be left up to the abort handler).
8. The container will not switch stacks, this is to support SYSCALL.
  a. Optionally, the container cannot switch stacks on SYSCALL, but for any other event it could save/restore.
9. The 'exit reason' is populated into the Container State Area.
10. If the 'exit reason' is due to the Deadline Timer; the Abort handler will:
  a. Save the GPRs if they are lazy save (or update them if this was a SYSCALL),
  b. Restore the stack to the thread stack,
  c. Put the container back into the container queue, and/or
  d. Grab a new container and go to (3) to start executing that container.

Certain embodiments herein support virtualization outside of virtual machine monitor (VMM) (e.g., code) enabling provided that the application is able to determine it can use the instructions. Given that without enabling, the VMM would be blocking any new feature identifying (e.g., CPUID) instructions, the software is to use alternative methods to figure out that this scenario is supported and what features can be used. In certain embodiments, the state is maintained completely inside the user mode (e.g., and as such cannot fault). In certain embodiments, all faults should be resolved before execution of the container.

Certain embodiments herein utilize a debugger or some debug extension to view the container state and display the context appropriately. In one embodiment, debugging including setting a debug flag (e.g., in RFLAGS register) in the context state area or hardcoding an interrupt, e.g., and aborting on those events. In one embodiment, the abort would save the extended instruction state (and optionally the RSP and GPRs) and then the debugger would simply view the Container for the RIP context and either the container or the thread's current state (e.g., if it is saved by the abort handler, which would not have run yet) to display the full container context. In certain embodiments, the debugger would allow a switch between the container's context and the current actual thread's context (e.g., which may be at the start of the abort handler or somewhere thereof).

Certain embodiments herein utilize a lazy state save. For example, in contrast to always saving the extended state that is not managed by the OS on exit of the container. This could cause additional overhead. To alleviate this, in certain embodiments (e.g., assuming an OS maintains TLB consistency across any ring context), the save area for container data (e.g., container state) is locked into the TLB and any resulting force flush of that TLB would cause the state to be saved at that time. In order for software to know if the state is still "active" or not before it can transfer a container to execute on another thread, in certain embodiments, an "active" bit is included in the container save area which identifies that the state is still active on the processor (e.g., CPU).

Certain operations (e.g., processor events) may cause a writeback of the extended ISA into the current container, for example, VM Exits, Ax_Enter into another container, and/or TLB invalidating operations.

Exemplary architectures, systems, etc. that the above may be used in are detailed below.

At least some embodiments of the disclosed technologies can be described in view of the following examples:

Example 1. A hardware processor comprising:
a decoder to decode a single instruction into a decoded single instruction; and
an execution circuit to execute the decoded single instruction to cause a context switch from a current state to a state comprising additional state data that is not supported by an execution environment of an operating system (or a VMM) that executes on the hardware processor.

Example 2. The hardware processor of example 1, where the single instruction is a user mode instruction.

Example 3. The hardware processor of example 1, wherein the single instruction comprises a field that identifies storage of the additional state data.

Example 4. The hardware processor of example 1, wherein the execution circuit is to re-execute the decoded single instruction until each memory page touched by the additional state data is available.

Example 5. The hardware processor of example 1, wherein the execution circuit is to execute the decoded single instruction to cause the hardware processor to enter a user mode managed state area that supports state management of an additional instruction not supported by the operating system.

Example 6. The hardware processor of example 5, wherein:
the decoder is to decode a single second instruction into a decoded single second instruction; and
the execution circuit is to execute the decoded single second instruction to cause an exit from the user mode managed state area.

Example 7. The hardware processor of example 6, wherein the execution circuit is to execute the decoded single second instruction to cause the exit from the user mode managed state area to an abort handler.

Example 8. The hardware processor of example 6, wherein the execution circuit is to execute the decoded single second instruction to cause a value indicating an exit reason to be populated into storage for the additional state data.

Example 9. A method comprising:
decoding a single instruction into a decoded single instruction with a decoder of a hardware processor; and
executing the decoded single instruction with an execution circuit of the hardware processor to cause a context switch from a current state to a state comprising additional state data that is not supported by an execution environment of an operating system (or a VMM) executing on the hardware processor.

Example 10. The method of example 9, where the single instruction is a user mode instruction.

Example 11. The method of example 9, wherein the single instruction comprises a field that identifies storage of the additional state data.

Example 12. The method of example 9, wherein the executing the decoded single instruction comprises re-executing the decoded single instruction until each memory page touched by the additional state data is available.

Example 13. The method of example 9, wherein executing the decoded single instruction causes the hardware processor to enter a user mode managed state area that supports state management of an additional instruction not supported by the operating system.

Example 14. The method of example 13, further comprising:
decoding a single second instruction into a decoded single second instruction with the decoder; and
executing the decoded single second instruction with the execution circuit to cause an exit from the user mode managed state area.

Example 15. The method of example 14, wherein the executing the decoded single second instruction causes the exit from the user mode managed state area to an abort handler.

Example 16. The method of example 14, wherein the executing the decoded single second instruction causes a value indicating an exit reason to be populated into storage for the additional state data.

Example 17. A non-transitory machine readable medium that stores code that when executed by a machine causes the machine to perform a method comprising:
decoding a single instruction into a decoded single instruction with a decoder of a hardware processor; and
executing the decoded single instruction with an execution circuit of the hardware processor to cause a context switch from a current state to a state comprising additional state data that is not supported by an execution environment of an operating system (or a VMM) executing on the hardware processor.

Example 18. The non-transitory machine readable medium of example 17, where the single instruction is a user mode instruction.

Example 19. The non-transitory machine readable medium of example 17, wherein the single instruction comprises a field that identifies storage of the additional state data.

Example 20. The non-transitory machine readable medium of example 17, wherein the executing the decoded single instruction comprises re-executing the decoded single instruction until each memory page touched by the additional state data is available.

Example 21. The non-transitory machine readable medium of example 17, wherein executing the decoded single instruction causes the hardware processor to enter a user mode managed state area that supports state management of an additional instruction not supported by the operating system.

Example 22. The non-transitory machine readable medium of example 21, the method further comprising:
decoding a single second instruction into a decoded single second instruction with the decoder; and executing the decoded single second instruction with the execution circuit to cause an exit from the user mode managed state area.

Example 23. The non-transitory machine readable medium of example 22, wherein the executing the decoded single second instruction causes the exit from the user mode managed state area to an abort handler.

Example 24. The non-transitory machine readable medium of example 22, wherein the executing the decoded single second instruction causes a value indicating an exit reason to be populated into storage for the additional state data.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
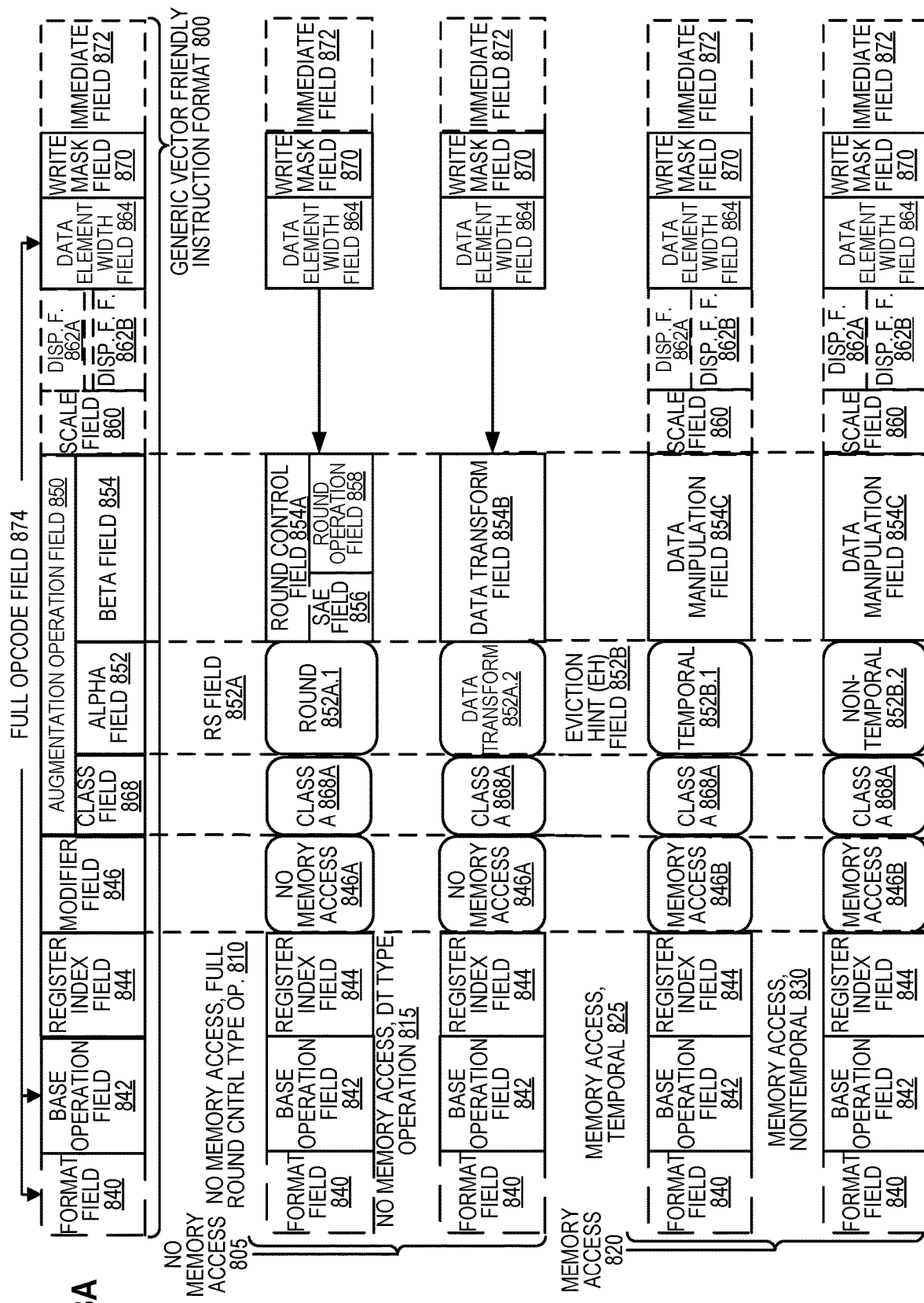
FIG. 8A is a block diagram illustrating a generic vector friendly instruction format and class A instruction templates thereof according to embodiments of the disclosure.
Figure 8B:
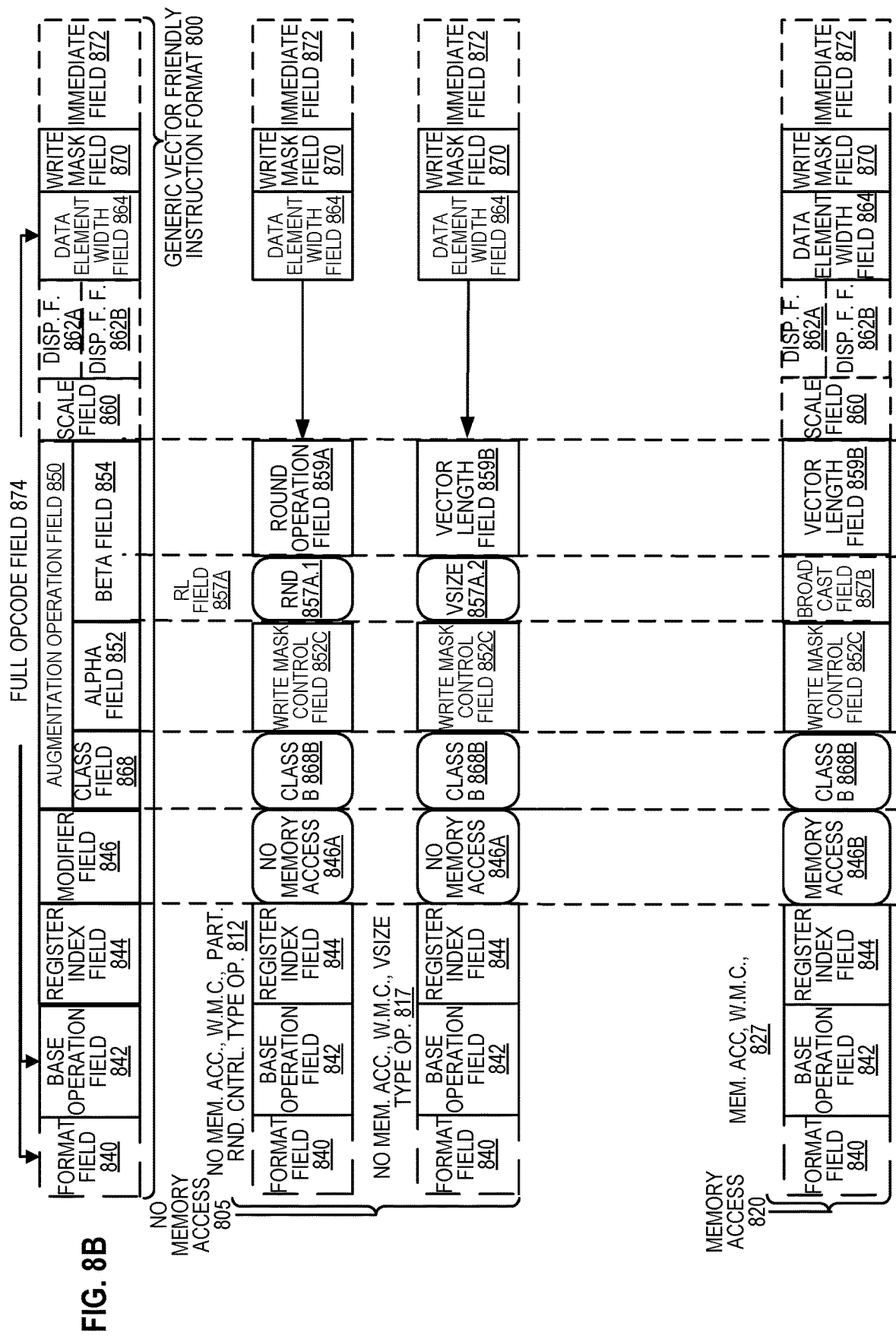
FIG. 8B is a block diagram illustrating the generic vector friendly instruction format and class B instruction templates thereof according to embodiments of the disclosure.

FIGS. 8A-8B are block diagrams illustrating a generic vector friendly instruction format and instruction templates thereof according to embodiments of the disclosure. FIG. 8A is a block diagram illustrating a generic vector friendly instruction format and class A instruction templates thereof according to embodiments of the disclosure; while FIG. 8B is a block diagram illustrating the generic vector friendly instruction format and class B instruction templates thereof according to embodiments of the disclosure. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the disclosure, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the disclosure are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the disclosure the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the disclosure where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the disclosure where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the disclosure. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the disclosure are described with reference to the specific vector friendly instruction format 900 in the context of the generic vector friendly instruction format 800 for illustrative purposes, the disclosure is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the disclosure is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the disclosure).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]-R), EVEX.X bit field (EVEX byte 1, bit [6]-X), and 857BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]-mmmm)—its content encodes an implied leading opcode byte (OF, OF 38, or OF 3).

Data element width field 864 (EVEX byte 2, bit [7]-W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]-U)—If EVEX.U=0, it indicates class A or EVEX.U0; if EVEX.U=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the disclosure. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the disclosure. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
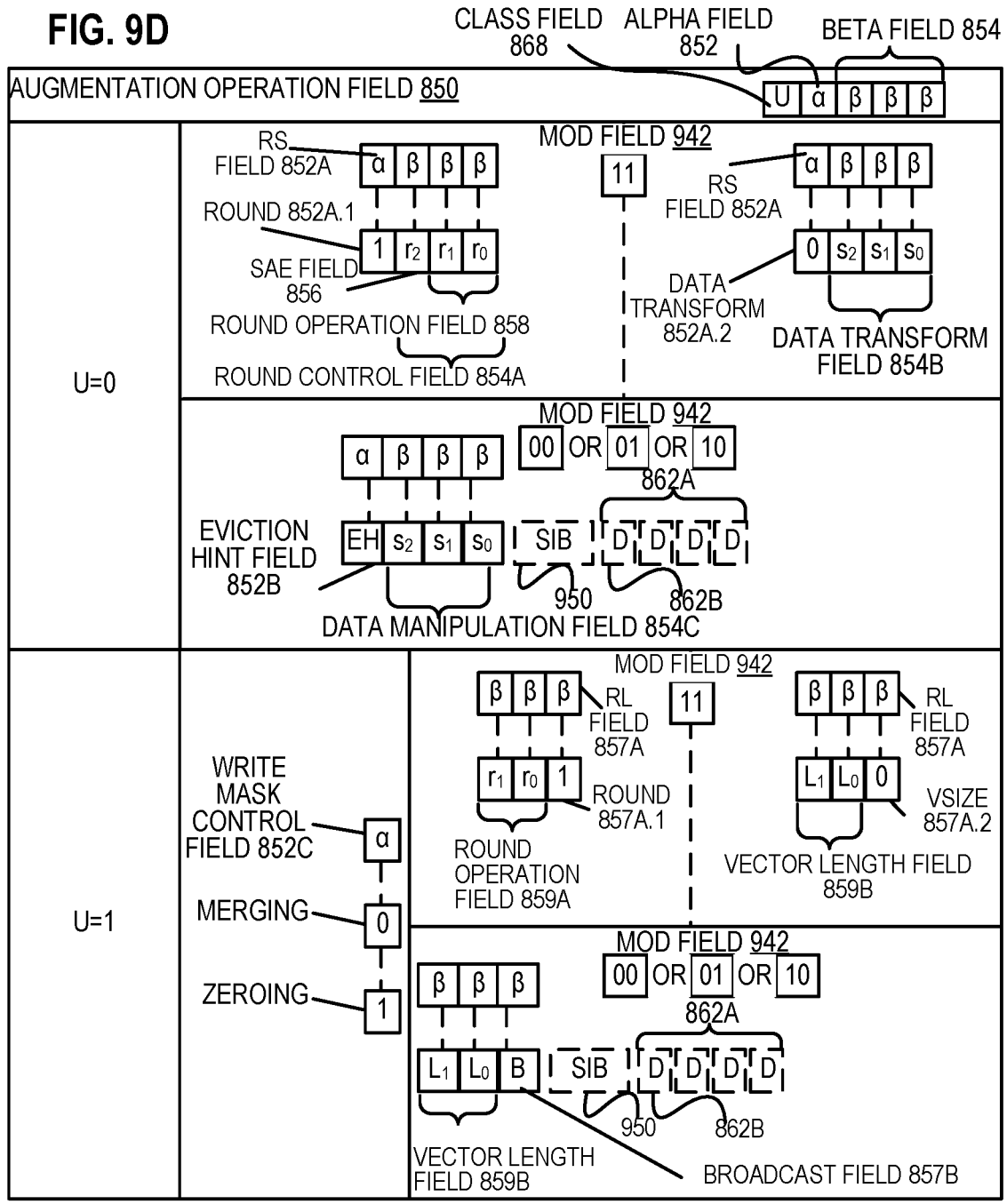
FIG. 9D is a block diagram illustrating the fields of the specific vector friendly instruction format in FIG. 9A that make up the augmentation operation field 850 according to one embodiment of the disclosure.

FIG. 9D is a block diagram illustrating the fields of the specific vector friendly instruction format 900 that make up the augmentation operation field 850 according to one embodiment of the disclosure. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]-EH) is interpreted as the rs field 852A. When the rs field 852A contains a 1 (round 852A.1), the beta field 854 (EVEX byte 3, bits [6:4]-SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]-SSS) is interpreted as a three bit data transform field 854B. When U=0 and the MOD field 942 contains 00, 01, or 10 (signifying a memory access operation), the alpha field 852 (EVEX byte 3, bit [7]-EH) is interpreted as the eviction hint (EH) field 852B and the beta field 854 (EVEX byte 3, bits [6:4]-SSS) is interpreted as a three bit data manipulation field 854C.

When U=1, the alpha field 852 (EVEX byte 3, bit [7]-EH) is interpreted as the write mask control (Z) field 852C. When U=1 and the MOD field 942 contains 11 (signifying a no memory access operation), part of the beta field 854 (EVEX byte 3, bit [4]-$S_0$) is interpreted as the RL field 857A; when it contains a 1 (round 857A.1) the rest of the beta field 854 (EVEX byte 3, bit [6-5]-$S_{2-1}$) is interpreted as the round operation field 859A, while when the RL field 857A contains a 0 (VSIZE 857.A2) the rest of the beta field 854 (EVEX byte 3, bit [6-5]-$S_{2-1}$) is interpreted as the vector length field 859B (EVEX byte 3, bit [6-5]-$L_{1-0}$). When U=1 and the MOD field 942 contains 00, 01, or 10 (signifying a memory access operation), the beta field 854 (EVEX byte 3, bits [6:4]-SSS) is interpreted as the vector length field 859B (EVEX byte 3, bit [6-5]-$L_{1-0}$) and the broadcast field 857B (EVEX byte 3, bit [4]-B).

Exemplary Register Architecture

Figure 10:
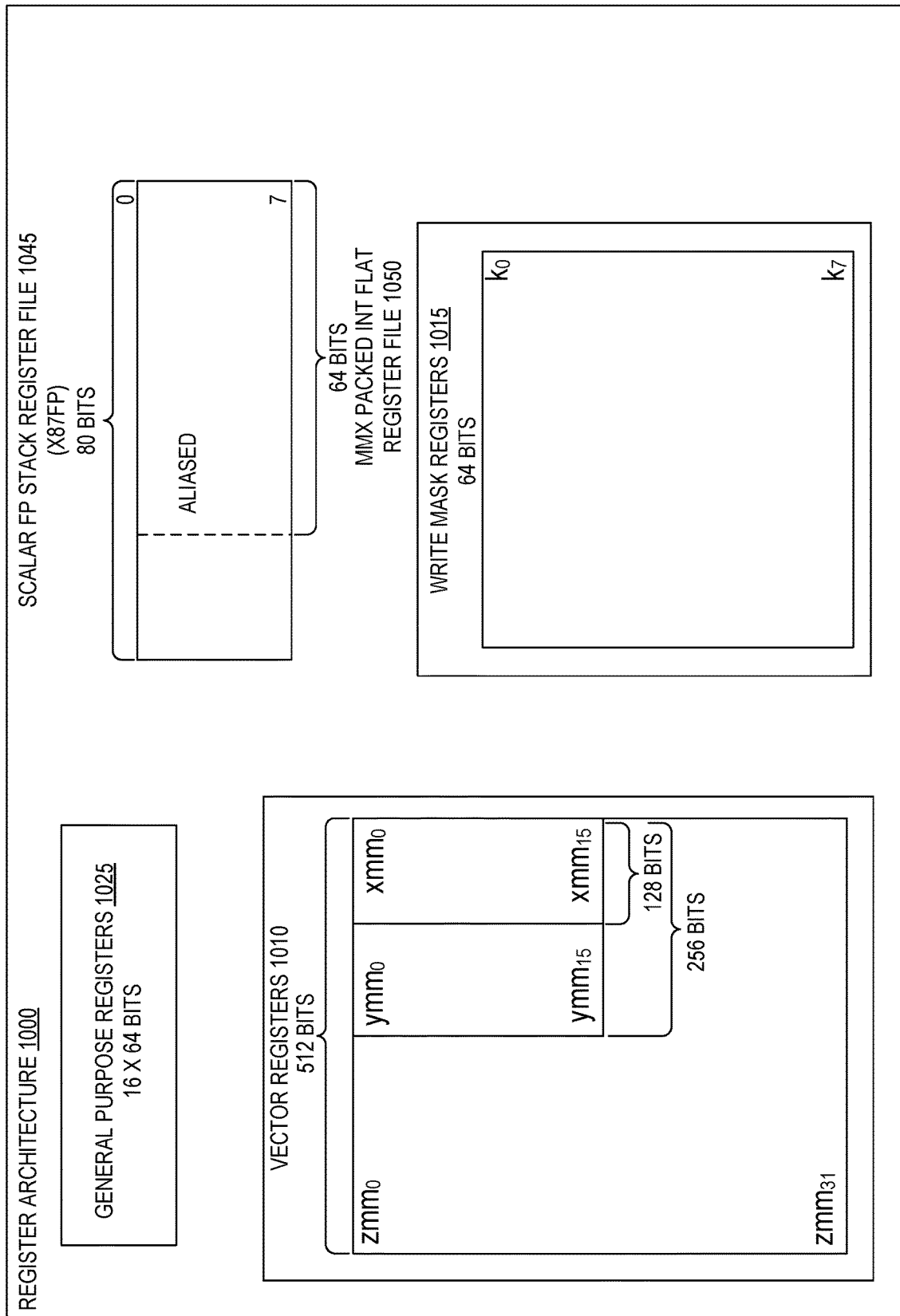
FIG. 10 is a block diagram of a register architecture according to one embodiment of the disclosure

FIG. 10 is a block diagram of a register architecture 1000 according to one embodiment of the disclosure. In the embodiment illustrated, there are 32 vector registers 1010 that are 512 bits wide; these registers are referenced as zmm0 through zmm31. The lower order 256 bits of the lower 16 zmm registers are overlaid on registers ymm0-16.

The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macro-instructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
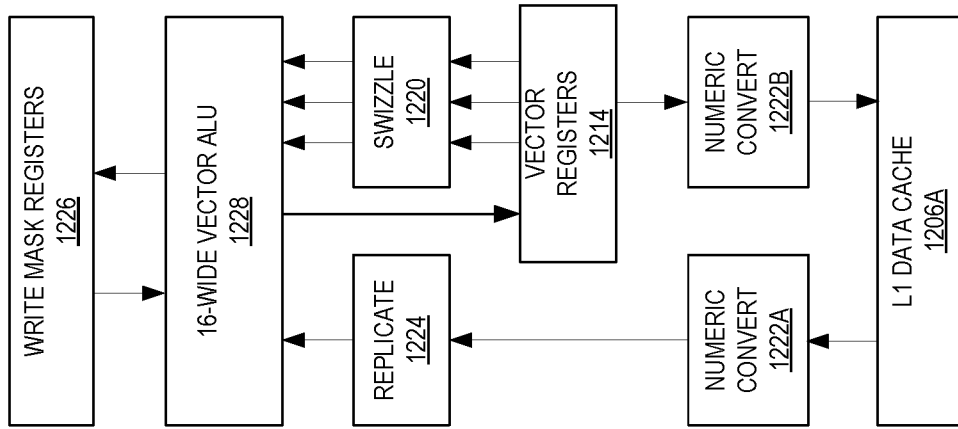
FIG. 12B is an expanded view of part of the processor core in FIG. 12A according to embodiments of the disclosure.
Figure 12A:
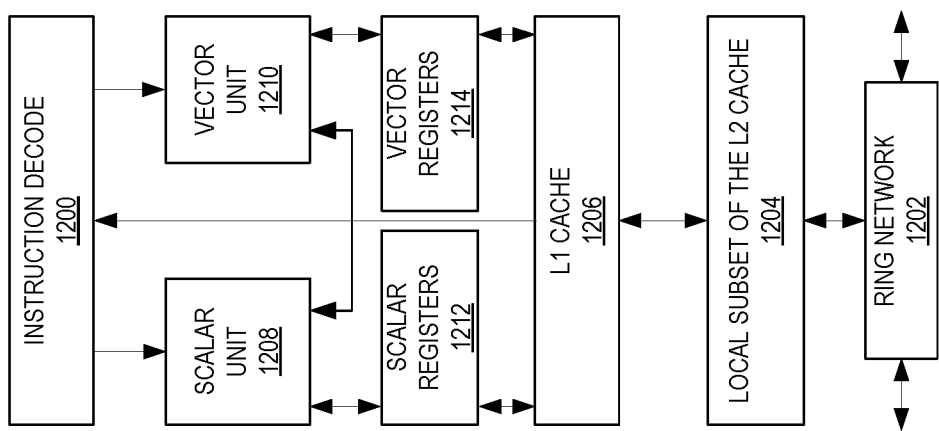
FIG. 12A is a block diagram of a single processor core, along with its connection to the on-die interconnect network and with its local subset of the Level 2 (L2) cache, according to embodiments of the disclosure.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the disclosure. In one embodiment, an instruction decode unit 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the disclosure may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the disclosure. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
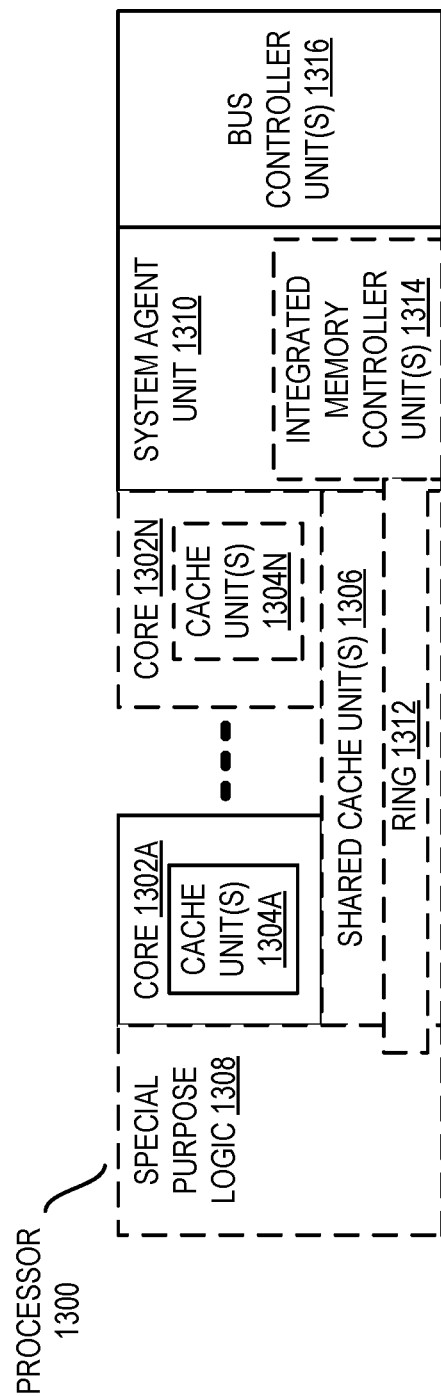
FIG. 13 is a block diagram of a processor that may have more than one core, may have an integrated memory controller, and may have integrated graphics according to embodiments of the disclosure.

FIG. 13 is a block diagram of a processor 1300 that may have more than one core, may have an integrated memory controller, and may have integrated graphics according to embodiments of the disclosure. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
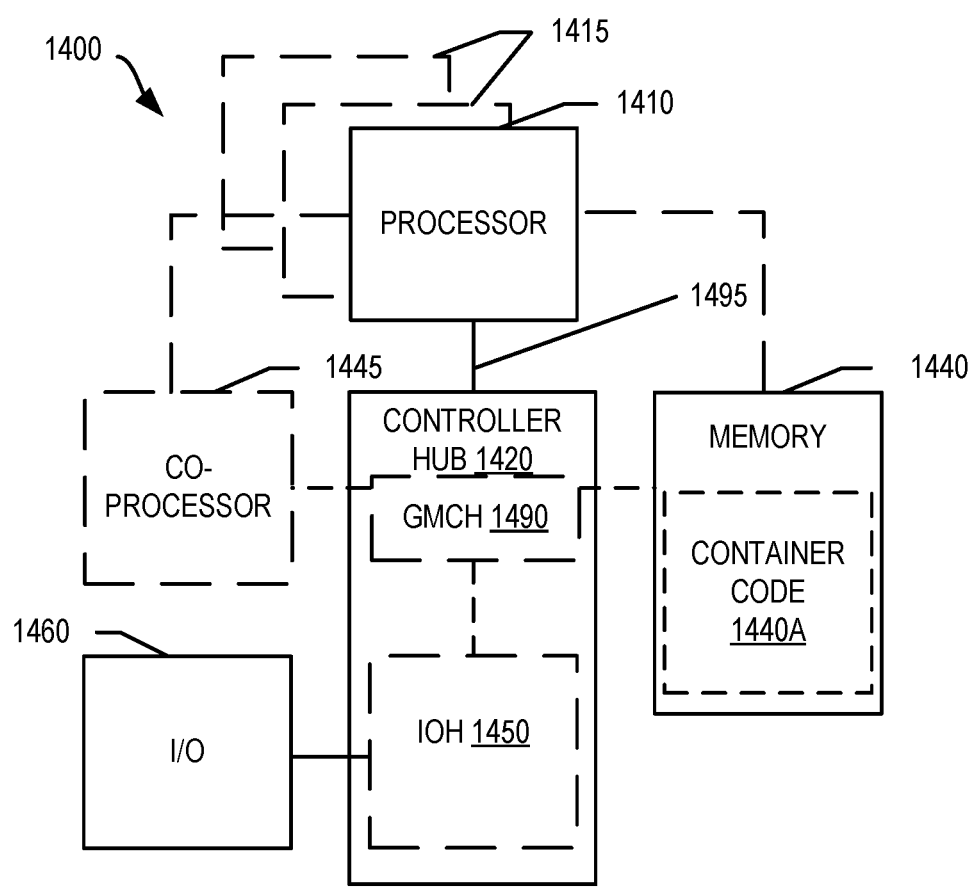
FIG. 14 is a block diagram of a system in accordance with one embodiment of the present disclosure.

Referring now to FIG. 14, shown is a block diagram of a system 1400 in accordance with one embodiment of the present disclosure. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450. Memory 1440 may include container code 1440A, for example, to store code that when executed causes a processor to perform any method of this disclosure.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as Quickpath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
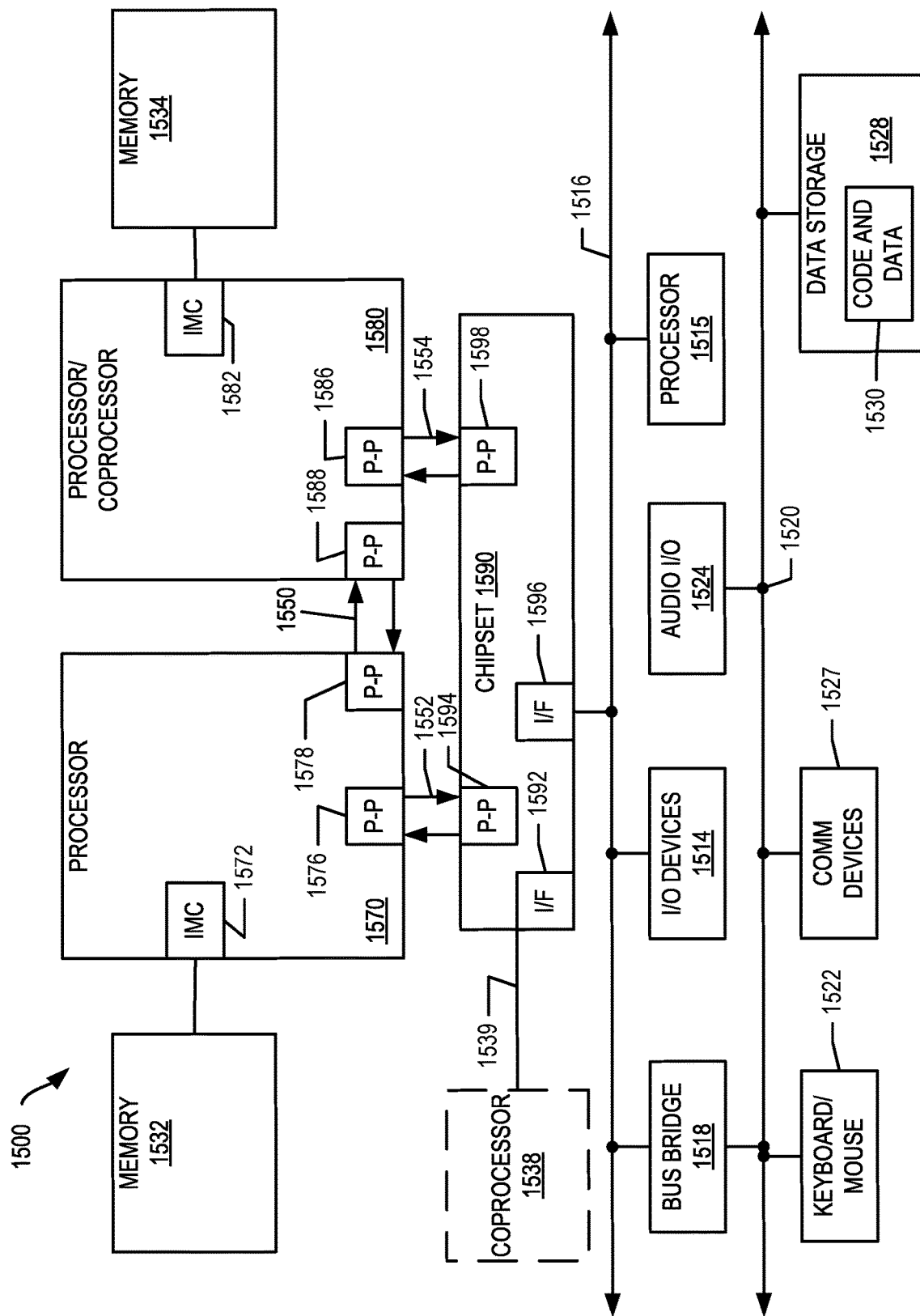
FIG. 15 is a block diagram of a more specific exemplary system in accordance with an embodiment of the present disclosure.

Referring now to FIG. 15, shown is a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
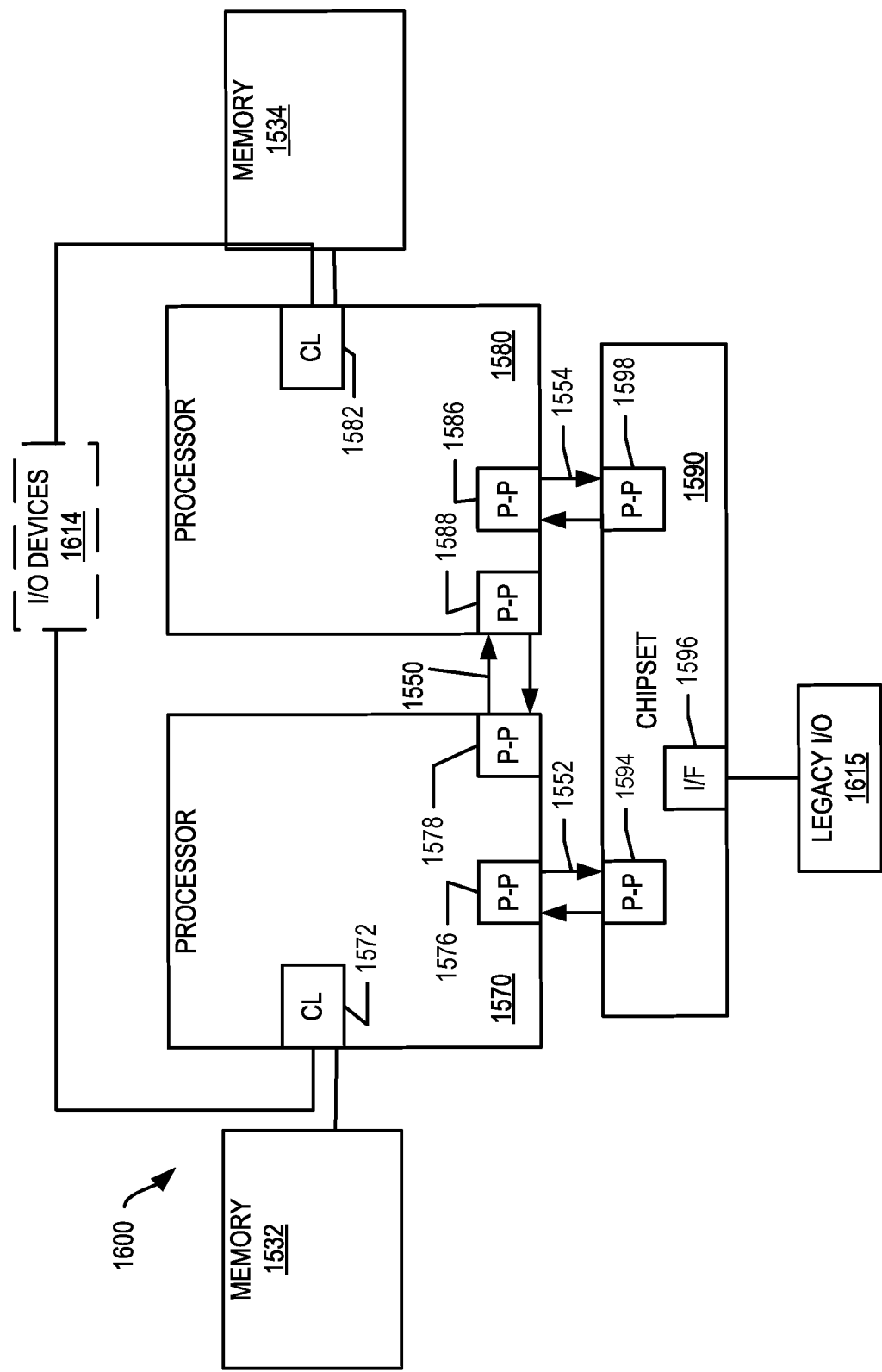
FIG. 16, shown is a block diagram of a second more specific exemplary system in accordance with an embodiment of the present disclosure.

Referring now to FIG. 16, shown is a block diagram of a second more specific exemplary system 1600 in accordance with an embodiment of the present disclosure. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
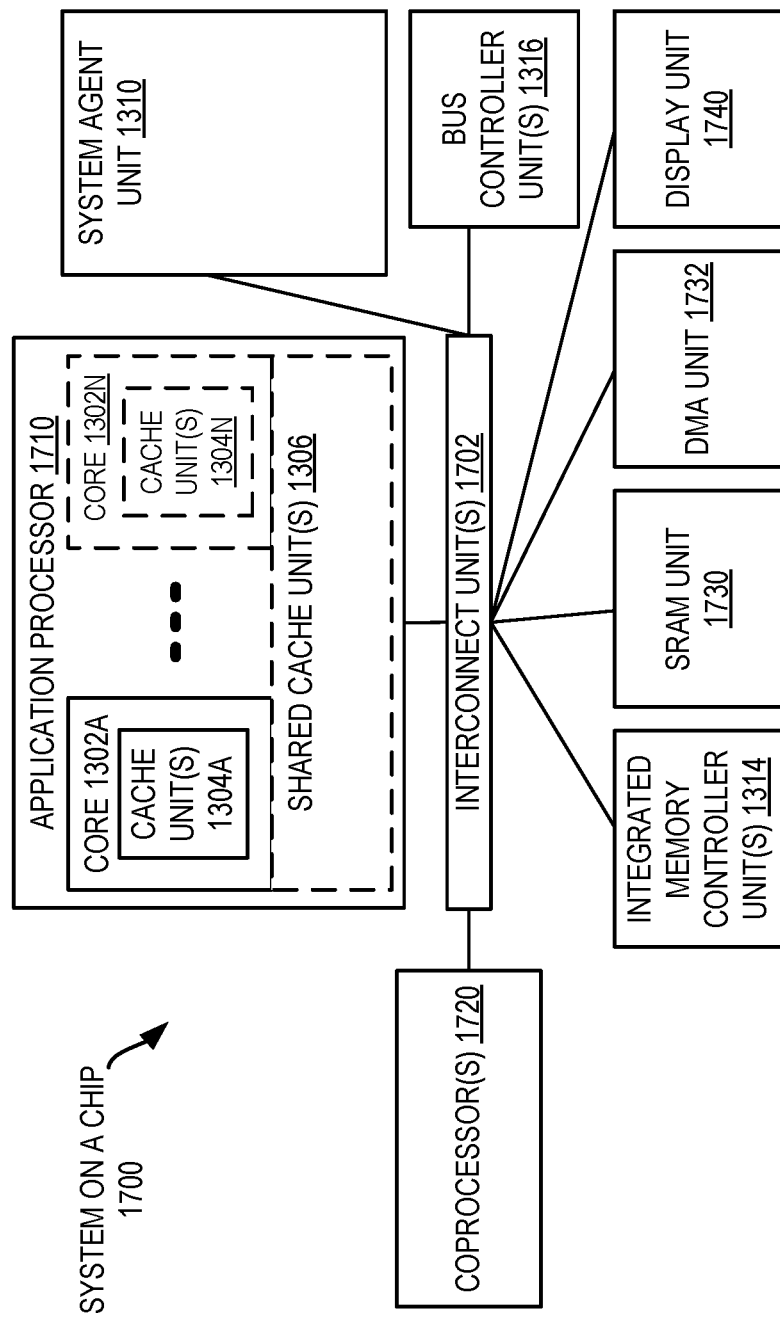
FIG. 17, shown is a block diagram of a system on a chip (SoC) in accordance with an embodiment of the present disclosure.

Referring now to FIG. 17, shown is a block diagram of a SoC 1700 in accordance with an embodiment of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N and shared cache unit(s) 1306; a system agent unit 1310; a bus controller unit(s) 1316; an integrated memory controller unit(s)

1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
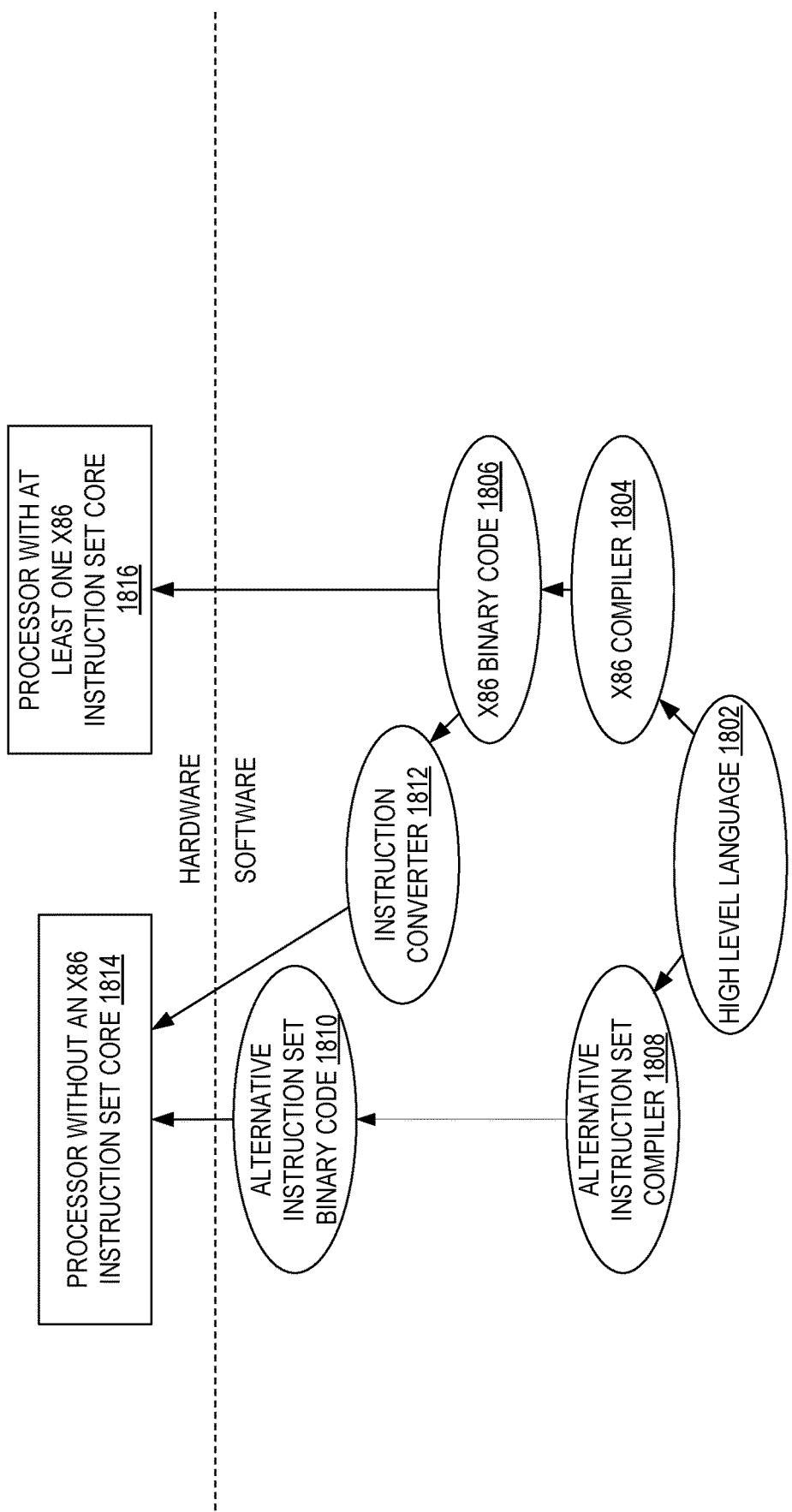
FIG. 18 is a block diagram contrasting the use of a software instruction converter to convert binary instructions in a source instruction set to binary instructions in a target instruction set according to embodiments of the disclosure.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A hardware processor comprising:
a decoder to decode a single instruction into a decoded single instruction; and
an execution circuit to execute the decoded single instruction to cause a context switch from a current state to a state comprising additional state data that is not supported by an execution environment of an operating system that executes on the hardware processor.

2. The hardware processor of claim 1, where the single instruction is a user mode instruction.

3. The hardware processor of claim 1, wherein the single instruction comprises a field that identifies storage of the additional state data.

4. The hardware processor of claim 1, wherein the execution circuit is to re-execute the decoded single instruction until each memory page touched by the additional state data is available.

5. The hardware processor of claim 1, wherein the execution circuit is to execute the decoded single instruction to cause the hardware processor to enter a user mode managed state area that supports state management of an additional instruction not supported by the operating system.

6. The hardware processor of claim 5, wherein:
the decoder is to decode a single second instruction into a decoded single second instruction; and
the execution circuit is to execute the decoded single second instruction to cause an exit from the user mode managed state area.

7. The hardware processor of claim 6, wherein the execution circuit is to execute the decoded single second instruction to cause the exit from the user mode managed state area to an abort handler.

8. The hardware processor of claim 6, wherein the execution circuit is to execute the decoded single second instruction to cause a value indicating an exit reason to be populated into storage for the additional state data.

9. A method comprising:
decoding a single instruction into a decoded single instruction with a decoder of a hardware processor; and
executing the decoded single instruction with an execution circuit of the hardware processor to cause a context switch from a current state to a state comprising additional state data that is not supported by an execution environment of an operating system executing on the hardware processor.

10. The method of claim 9, where the single instruction is a user mode instruction.

11. The method of claim 9, wherein the single instruction comprises a field that identifies storage of the additional state data.

12. The method of claim 9, wherein the executing the decoded single instruction comprises re-executing the decoded single instruction until each memory page touched by the additional state data is available.

13. The method of claim 9, wherein executing the decoded single instruction causes the hardware processor to enter a user mode managed state area that supports state management of an additional instruction not supported by the operating system.

14. The method of claim 13, further comprising:
decoding a single second instruction into a decoded single second instruction with the decoder; and
executing the decoded single second instruction with the execution circuit to cause an exit from the user mode managed state area.

15. The method of claim 14, wherein the executing the decoded single second instruction causes the exit from the user mode managed state area to an abort handler.

16. The method of claim 14, wherein the executing the decoded single second instruction causes a value indicating an exit reason to be populated into storage for the additional state data.

17. A non-transitory machine readable medium that stores code that when executed by a machine causes the machine to perform a method comprising:
decoding a single instruction into a decoded single instruction with a decoder of a hardware processor; and
executing the decoded single instruction with an execution circuit of the hardware processor to cause a context switch from a current state to a state comprising additional state data that is not supported by an execution environment of an operating system executing on the hardware processor.

18. The non-transitory machine readable medium of claim 17, where the single instruction is a user mode instruction.

19. The non-transitory machine readable medium of claim 17, wherein the single instruction comprises a field that identifies storage of the additional state data.

20. The non-transitory machine readable medium of claim 17, wherein the executing the decoded single instruction comprises re-executing the decoded single instruction until each memory page touched by the additional state data is available.

21. The non-transitory machine readable medium of claim 17, wherein executing the decoded single instruction causes the hardware processor to enter a user mode managed state area that supports state management of an additional instruction not supported by the operating system.

22. The non-transitory machine readable medium of claim 21, the method further comprising:
decoding a single second instruction into a decoded single second instruction with the decoder; and
executing the decoded single second instruction with the execution circuit to cause an exit from the user mode managed state area.

23. The non-transitory machine readable medium of claim 22, wherein the executing the decoded single second instruction causes the exit from the user mode managed state area to an abort handler.

24. The non-transitory machine readable medium of claim 22, wherein the executing the decoded single second instruction causes a value indicating an exit reason to be populated into storage for the additional state data.

* * * * *